US012085880B2

(12) United States Patent
Aihara et al.

(10) Patent No.: US 12,085,880 B2
(45) Date of Patent: Sep. 10, 2024

(54) IMAGE FORMING APPARATUS

(71) Applicant: CANON KABUSHIKI KAISHA, Tokyo (JP)

(72) Inventors: Ryo Aihara, Chiba (JP); Hisashi Tsukijima, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/145,675

(22) Filed: Dec. 22, 2022

(65) Prior Publication Data

US 2023/0221665 A1 Jul. 13, 2023

(30) Foreign Application Priority Data

Jan. 7, 2022 (JP) ................................ 2022-001577

(51) Int. Cl.
*G03G 15/20* (2006.01)

(52) U.S. Cl.
CPC ................................ *G03G 15/2053* (2013.01)

(58) Field of Classification Search
CPC ............ G03G 15/205; G03G 15/2017; G03G 15/2028; G03G 15/2039; G03G 15/2046; G03G 15/2053; G03G 2215/2045
See application file for complete search history.

(56) References Cited

U.S. PATENT DOCUMENTS

2009/0092409 A1* 4/2009 Chiyoda .............. G03G 15/657
399/67

FOREIGN PATENT DOCUMENTS

| | | | |
|---|---|---|---|
| JP | 2015-108799 | A | 6/2015 |
| JP | 2015-114551 | A | 6/2015 |
| JP | 2017-207648 | A | 11/2017 |

* cited by examiner

*Primary Examiner* — Thomas S Giampaolo, II
(74) *Attorney, Agent, or Firm* — Canon U.S.A., Inc. IP Division

(57) ABSTRACT

An image forming apparatus includes a transfer portion to transfer a toner image to a recording material, a fixing portion having a heating unit and a cylindrical rotary member and to fix the toner image to the recording material, a fixing drive portion to drive the cylindrical rotary member, and a controller. In a case in which images are formed on a plurality of recording materials, the controller controls the fixing drive portion based on a time period from a time when a trailing edge of a preceding recording material passes through the fixing portion to a time when a leading edge of a subsequent recording material passes through the fixing portion so that a second rotation speed of the cylindrical rotary member when conveying the subsequent recording material becomes lower than a first rotation speed of the cylindrical rotary member when conveying the preceding recording material.

13 Claims, 15 Drawing Sheets

IMAGE FORMING APPARATUS

BACKGROUND OF THE DISCLOSURE

Field of the Disclosure

The present disclosure relates to an image forming apparatus having a fixing portion configured to fix a toner image to a recording material.

Description of the Related Art

Here, an electrophotographic image forming apparatus forms an image on a recording material using an electrophotographic image forming process. Examples of the electrophotographic image forming apparatus include an electrophotographic copying apparatus (such as a digital copying apparatus), an electrophotographic printer (such as a color laser beam printer and a color LED printer), an MFP (multifunction peripheral), a facsimile machine and a printing machine. The electrophotographic image forming apparatus (hereinafter referred to as an image forming apparatus) is not limited to an image forming apparatus that forms color images, and may be an image forming apparatus that forms monochrome images.

In the image forming process of the image forming apparatus, a surface of an image bearing member is uniformly charged by a charger. An exposure device exposes the uniformly charged surface of the image bearing member according to image data to form an electrostatic latent image on the surface of the image bearing member. A developing device develops the electrostatic latent image by using toner to form a toner image (visible image). A transfer portion transfers the toner image to a recording material. A fixing portion heats and pressurizes the toner image on the recording material to fix the toner image to the recording material so that an image is formed on the recording material.

Here, the fixing portion comprises, for example, a pressure roller and a fixing roller as a pair of rotary members, and a heater. Since the pressure roller is an elastic roller provided with an elastic member such as a silicone rubber on an outer periphery of a roller, the pressure roller expands thermally when heated by the heater. As a result, it is known that a conveyance speed of the recording material conveyed by the fixing portion changes (Japanese Patent Application Laid-Open No. 2015-114551). When a speed difference between a conveyance speed of the recording material conveyed by the transfer portion and the conveyance speed of the recording material conveyed by the fixing portion changes, the recording material is pulled by the fixing portion or a deflection shape of the recording material changes between the fixing portion and the transfer portion. As a result, various image defects occur, the recording material rubs against a conveyance guide to be damaged, and poor conveyance of the recording material occurs.

Therefore, an image forming apparatus has been proposed that detects the conveyance speed of the recording material conveyed by the fixing portion and controls a driving speed of the pressure roller to correct the change in the conveyance speed caused by the thermal expansion of the pressure roller. Japanese Patent Application Laid-Open No. 2017-207648 discloses that a deflection amount of the recording material between the transfer portion and the fixing portion is detected by a sensor, and the driving speed of the fixing portion is controlled by acceleration and deceleration based on a detection result of the deflection amount. Japanese Patent Application Laid-Open No. 2015-108799 discloses that a transit time from a leading edge to a trailing edge of the recording material is detected by a sensor disposed downstream of the fixing portion in a conveyance direction of the recording material, and a conveyance speed of a subsequent recording material by the fixing portion is corrected.

In a case of the control to correct the conveyance speed of the fixing portion based on the detection result of the deflection amount of the recording material between the transfer portion and the fixing portion, a conveyance section in which the deflection amount of the recording material can be stably detected is required.

On the other hand, according to the Japanese Patent Application Laid-Open No. 2015-108799, the transit time from the leading edge to the trailing edge of a preceding recording material is detected, and the conveyance speed of the subsequent recording material by the fixing portion is corrected based on the detection result of the transit time. Therefore, it is possible to control the conveyance speed of the fixing portion regardless of the length of the recording material. However, in a case in which an interval between a plurality of recording materials continuously passing through the fixing portion changes, if the conveyance speed of the subsequent recording material is corrected based on the detection result of the transit time of the preceding recording material, a correction amount may be mistaken due to the following reasons.

In the image forming apparatus of the electrophotographic method, an interruption control is performed during a continuous printing to perform various corrections because an environment in the image forming apparatus changes or a state of developer changes due to continuous operation. During such interruption control, conveyance of the recording material is temporarily interrupted, so that the recording material, which takes heat away from the fixing roller, does not pass through the fixing portion and the pressure roller rapidly expands. As a result, when the interval between the preceding recording material and the subsequent recording material is increased by the interruption control, the conveyance speed of the subsequent recording material by the fixing portion becomes rapidly larger than the conveyance speed of the preceding recording material by the fixing portion. In such a case, the conveyance speed of the subsequent recording material cannot be appropriately corrected based on the detection result of the transit time of the preceding recording material.

SUMMARY OF THE DISCLOSURE

According to an aspect of the present disclosure, an image forming apparatus includes a transfer portion configured to transfer a toner image to a recording material conveyed in a conveyance direction, a fixing portion disposed downstream of the transfer portion in the conveyance direction, having a heating unit and a cylindrical rotary member configured to convey the recording material, and configured to fix the toner image to the recording material conveyed from the transfer portion, a fixing drive portion configured to drive the cylindrical rotary member, and a controller configured to control the fixing drive portion to control a rotation speed of the cylindrical rotary member, wherein, in a case in which images are formed on a plurality of recording materials, the controller controls the fixing drive portion based on a time period from a time when a trailing edge of a preceding recording material passes through the fixing portion to a time when a leading edge of a subsequent recording material passes through the fixing portion so that a second rotation speed of the cylindrical rotary member when conveying the subsequent recording material becomes lower than a first rotation speed of the cylindrical rotary member when conveying the preceding recording material.

Further features of the present disclosure will become apparent from the following description of exemplary embodiments with reference to the attached drawings.

DESCRIPTION OF THE EMBODIMENTS

The embodiments will be described below with reference to the accompanying drawings. However, dimensions, materials, shapes, and relative arrangements of components described in the embodiments below are not intended to limit the embodiments to those only, unless otherwise specified.

First Embodiment (Configuration and Operation of Image Forming Apparatus)

Figure 1:
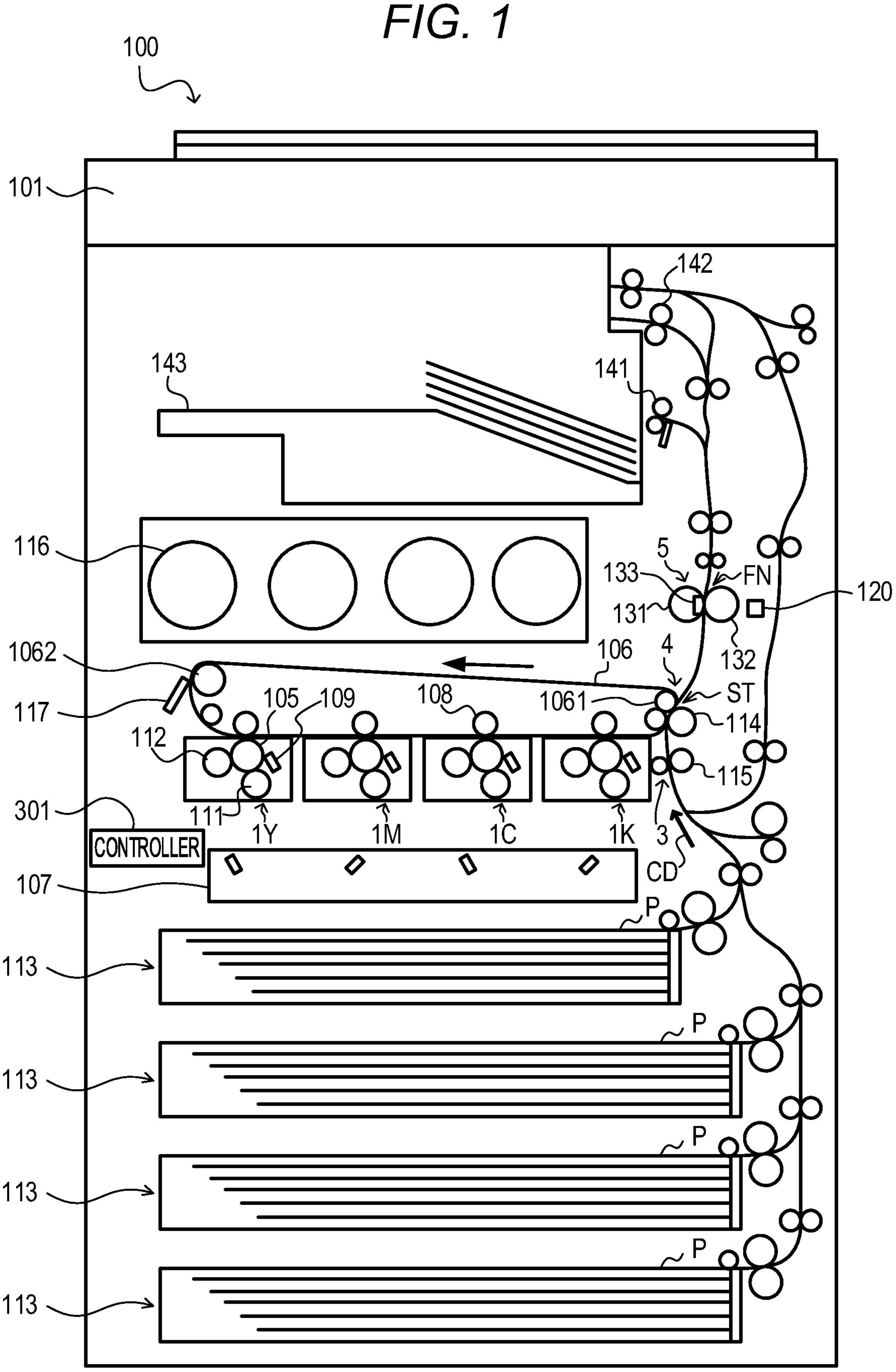
FIG. 1 is a cross-sectional view of an image forming apparatus.
Figure 2:
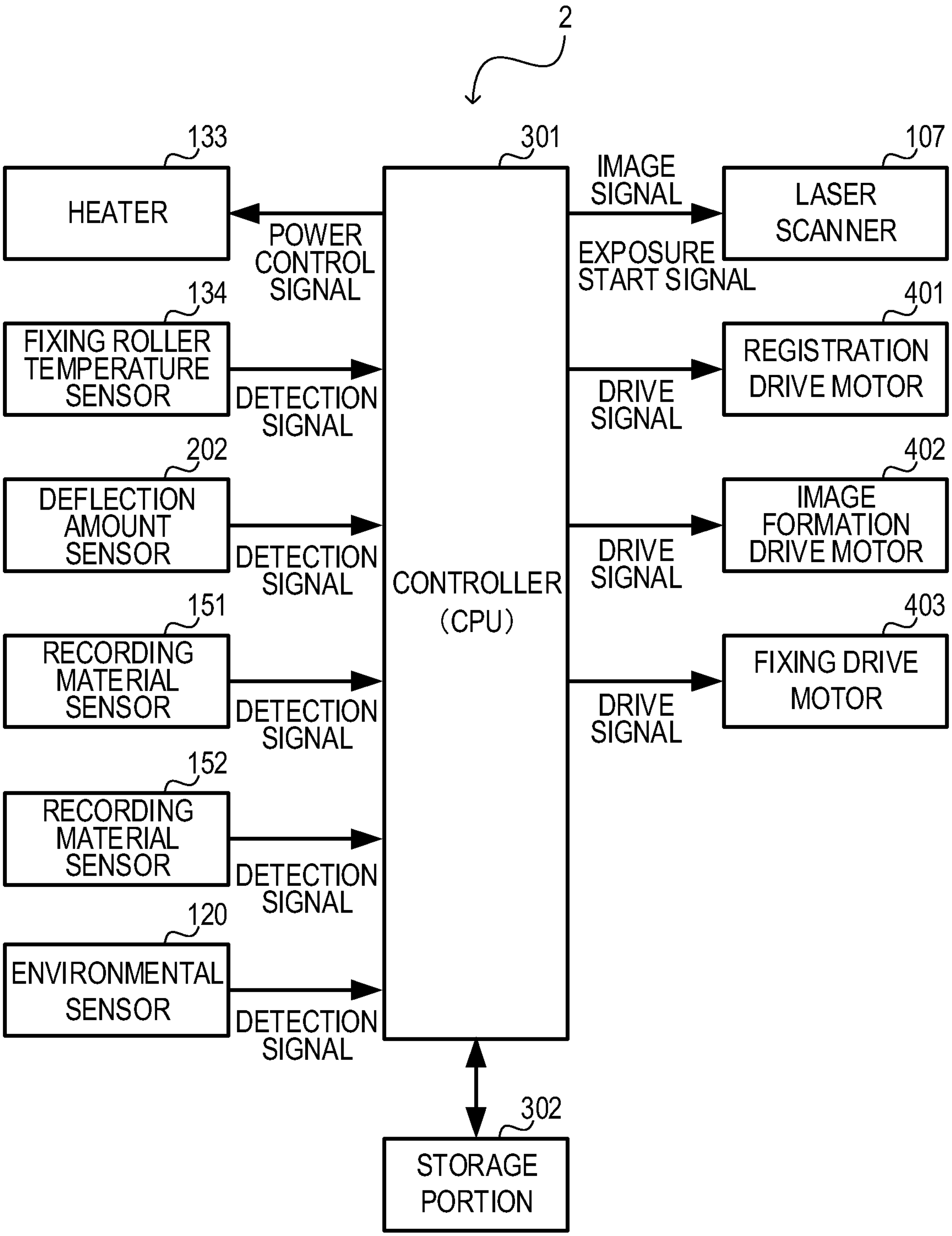
FIG. 2 is a block diagram of a control system of the image forming apparatus.

FIG. 1 is a cross-sectional view of an image forming apparatus 100. The image forming apparatus 100 is a color digital printer of a tandem type of an intermediate transfer method having four image forming portions 1Y, 1M, 1C, and 1K. FIG. 2 is a block diagram of a control system 2 of the image forming apparatus 100. The image forming portions 1Y, 1M, 1C, and 1K form yellow (Y), magenta (M), cyan (C), and black (K) toner images, respectively. The configuration and operation of the image forming portions 1Y, 1M, 1C, and 1K are substantially the same except that the toner colors are different. Therefore, in the case where there is no need to distinguish components, particularly, in the following description, the relevant components are described in a comprehensive manner.

The image forming apparatus 100 includes a housing 101. The housing 101 contains respective mechanisms constituting the image forming portions 1Y, 1M, 1C, and 1K and a control board housing portion (not shown) configured to house a Central Processing Unit (CPU) as a controller 301 (control unit) configured to control each image forming process by each mechanism. The housing 101 is provided with an environmental sensor 120 configured to obtain temperature and humidity as an external environment.

Four photosensitive drums 105 as image bearing members are rotated clockwise in FIG. 1. A charging roller 111 charges a surface of the photosensitive drum 105 to a uniform charge. The controller 301 inputs yellow, magenta, cyan and black image data to a laser scanner 107 (exposure device) as an exposure unit. The laser scanner 107 emits laser light modulated according to the image data of each color onto the surface of each photosensitive drum 105 to form an electrostatic latent image.

A developing device 112 develops the electrostatic latent image formed on the surface of the photosensitive drum 105 with toner (developer) of each color. That is, the developing device 112 attaches the toner charged with the same polarity as a charging polarity of the photosensitive drum 105 to the electrostatic latent image, and exposes the electrostatic latent image as a yellow, magenta, cyan, or black toner image (reversal development). The toner images formed on the photosensitive drums 105 are sequentially transferred (primary transfer) by primary transfer rollers 108 to an intermediate transfer belt 106 rotated counterclockwise in FIG. 1, and superimposed on the intermediate transfer belt 106 to form a full-color toner image. At this time, a primary transfer voltage (primary transfer bias), which is a DC voltage with a polarity opposite to the charging polarity of the toner at the time of development, is applied to the primary transfer roller 108. Toner remaining on the photosensitive drum 105 after the primary transfer is removed and recovered by a drum cleaner 109.

A plurality of storage compartments 113 configured to store recording materials P are provided in a lower portion of the image forming apparatus 100. The recording material is a sheet on which an image is formed by the image forming apparatus 100, such as plain paper, recycled paper, thick paper, intermediate paper, overhead projector (OHP) sheet, colored paper, pre-punched paper, pre-printed paper, plastic sheet, letterhead paper or label paper. The recording material P fed from the storage compartment 113 is conveyed to the registration portion 3. The registration portion 3 comprises a pair of registration rollers 115. A leading edge of the recording material P abuts against a nip portion of the pair of registration rollers 115 that are stopped, and deflection (loop) is formed in the recording material P to correct a skew feed of the recording material P.

A secondary transfer portion 4 (transfer portion) is provided downstream of the registration portion 3 in a conveyance direction CD of the recording material P. The registration portion 3 is disposed upstream of the secondary transfer portion 4 in the conveyance direction CD of the recording material P, and conveys the recording material P to the secondary transfer portion 4. The secondary transfer portion 4 has a secondary transfer inner roller 1061 and a secondary transfer outer roller 114. With the intermediate transfer belt 106 sandwiched between the secondary transfer inner roller 1061 and the secondary transfer outer roller 114, a secondary transfer nip portion ST is formed between the intermediate transfer belt 106 and the secondary transfer outer roller 114. A registration roller 115 is driven by a registration drive motor 401 (registration drive portion). The controller 301 inputs a drive signal to the registration drive motor 401 to start the rotation of the registration roller 115 so that the leading edge of the recording material P coincides with the leading edge of the toner image on the intermediate transfer belt 106 at the secondary transfer nip portion ST. The recording material P is conveyed to the secondary transfer portion 4 by the registration roller 115.

In a case in which images are formed on a plurality of recording materials, the controller 301 stops the registration drive motor 401 at least once after a trailing edge of a preceding recording material passes through the registration portion 3, and then starts driving again to convey a subsequent recording material to the secondary transfer portion 4.

The toner image on the intermediate transfer belt 106 is transferred to the recording material P by the secondary transfer outer roller 114 in the secondary transfer portion 4 (secondary transfer). At this time, a secondary transfer voltage (secondary transfer bias), which is a DC voltage with a polarity opposite to the charging polarity of the toner at the time of development, is applied to the secondary transfer outer roller 114. Toner remaining on the intermediate transfer belt 106 after secondary transfer is removed and recovered by an intermediate transfer belt cleaner 117.

A fixing portion 5 is disposed downstream of the secondary transfer portion 4 in the conveyance direction CD of the recording material P. The recording material P onto which the toner image has been transferred is conveyed to the fixing portion 5. The fixing portion 5 has a fixing roller 131 and a pressure roller 132, which are a pair of rotary members, and a heater 133 as a heating member (heating unit) disposed inside the fixing roller 131. The fixing roller 131 and the pressure roller 132 are pressed against each other to form a fixing nip portion FN. The toner image transferred on the recording material P is heated and pressurized while being held and conveyed by the fixing roller 131 and the pressure roller 132 at the fixing nip portion FN and fixed to the recording material P.

In the fixing roller 131, a rubber layer with high thermal conductivity is formed on a thin tubular metal base layer. A release layer of fluororesin is formed on a surface of the rubber layer. The pressure roller 132 is a cylindrical rotary member in which an elastic layer such as flexible silicone rubber is provided on an outside of a solid or hollow cylindrical metal shaft of iron or aluminum. The release layer of fluororesin is formed on the surface of the elastic layer. The pressure roller 132 is strongly pressed against the fixing roller 131 to improve the fixability of the toner image, so that the fixing nip portion FN is formed in a planar shape.

The heater 133 provided in the fixing roller 131 applies heat to the fixing nip portion FN. A surface temperature of the fixing roller 131 is detected by a fixing roller temperature sensor 134 (temperature detector). Temperature information on the surface of the fixing roller 131 detected by the fixing roller temperature sensor 134 is input to the controller 301 as a detection signal. The controller 301 outputs a power control signal to the heater 133 based on the input temperature information, and controls a supply power to the heater 133 to control the surface temperature of the fixing roller 131 so that the surface temperature of the fixing roller 131 is maintained at a predetermined temperature. The controller 301 can control the heater 133 to at least a first temperature to fix the toner image to the recording material and a second temperature lower than the first temperature. The second temperature is, for example, an environmental temperature. The fixing roller 131 may be a tube-shaped film or a cylindrical rotary member.

The pressure roller 132 of the fixing portion 5 is driven by a fixing drive motor 403 (fixing drive portion). The controller 301 outputs a drive signal to the fixing drive motor 403, rotates the pressure roller 132 by the fixing drive motor 403, and conveys the recording material P nipped by the fixing nip portion FN between the fixing roller 131 and the pressure roller 132. The recording material P to which the toner image is fixed by the fixing portion 5 is discharged onto a discharge tray 143 by a discharge portion 141 or a discharge portion 142.

(Fixing Drive Control According to Conveyance Timing of Recording Material)

Figure 3A:
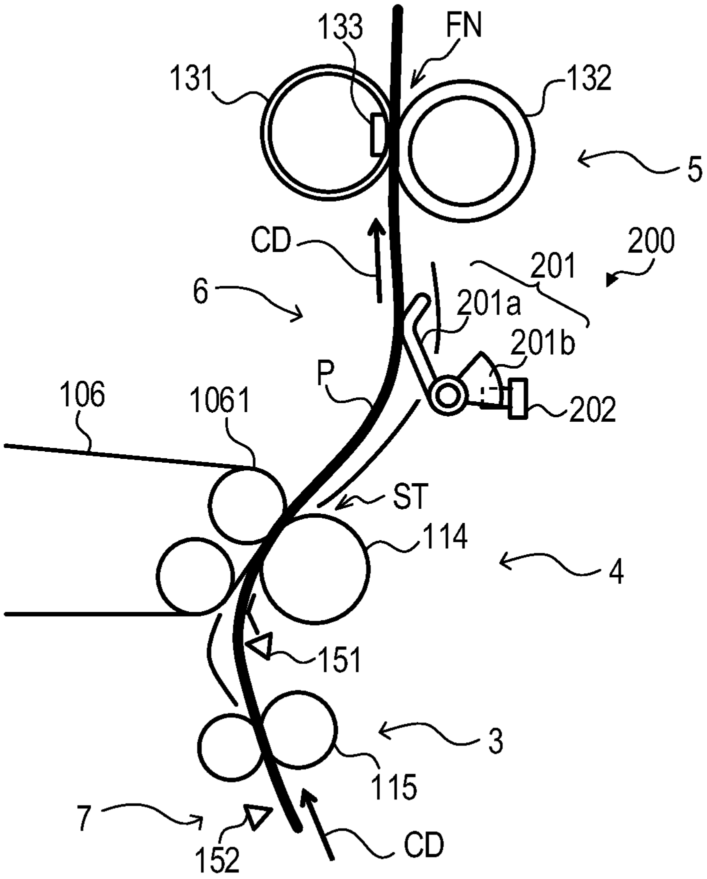
FIG. 3A and FIG. 3B are enlarged views of a conveyance path from a registration portion to a fixing portion.
Figure 3B:
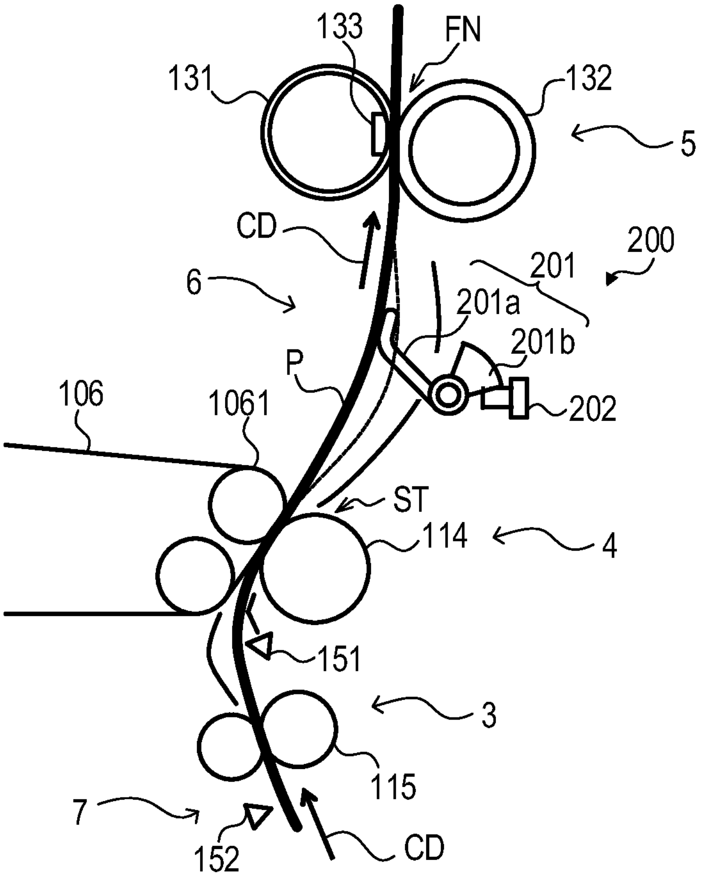

Next, a fixing drive control according to a conveyance timing of the recording material P will be described. FIG. 3A and FIG. 3B are enlarged views of a conveyance path 6 from the registration portion 3 to the fixing portion 5. A deflection amount detection portion 200 (conveyance speed detection unit) configured to detect a deflection amount of the recording material P between the secondary transfer portion 4 and the fixing portion 5 is provided in the conveyance path 6 between the secondary transfer portion 4 and the fixing portion 5. The deflection amount detection portion 200 also functions as a conveyance speed detection unit configured to detect a conveyance speed of the recording material based on a deflection amount detection result when the recording material is conveyed with extending over the secondary transfer portion 4 and the fixing portion 5. The deflection amount detection portion 200 has a deflection amount detection flag 201 and a deflection amount sensor 202. The deflection amount detection flag 201 is urged by a weak force of a flag spring (not shown) as an urging member so that the deflection amount detection flag 201 rotates toward the conveyance path 6. The deflection amount sensor 202 is a transmission type photosensor (photo interrupter sensor) including a light emitting element (not shown) and a light receiving element (not shown) disposed opposite to each other. When light reaches the light receiving element (not shown) from the light emitting element (not shown), the deflection amount sensor 202 outputs an OFF signal. When the light from the light emitting element (not shown) is blocked by the deflection amount detection flag 201, the deflection amount sensor 202 outputs an ON signal.

When the recording material P is nipped and conveyed by both the secondary transfer nip portion ST of the secondary transfer portion 4 and the fixing nip portion FN of the fixing portion 5, the recording material P is deflected by a speed difference between a conveyance speed of the secondary transfer portion 4 and a conveyance speed of the fixing portion 5. When the recording material P is deflected in the conveyance path 6 between the secondary transfer portion 4 and the fixing portion 5, one end 201_a_ of the deflection amount detection flag 201 is pushed by the recording material P. The one end 201_a_ of the deflection amount detection flag 201 rotates away from the conveyance path 6 against the urging force of the flag spring (not shown) according to the deflection amount of the recording material P. Accordingly, the other end 201_b_ of the deflection amount detection flag 201 enters between the light emitting element (not shown) and the light receiving element (not shown) of the deflection amount sensor 202. As shown in FIG. 3A, when the deflection amount of the recording material P becomes larger than a predetermined amount (predetermined range), the other end 201_b_ of the deflection amount detection flag 201 blocks an optical axis of the deflection amount sensor 202, and the output signal of the deflection amount sensor 202 changes from the OFF signal to the ON signal. That is, when the output signal of the deflection amount sensor 202 is the ON signal, the deflection amount of the recording material P is larger than the predetermined amount as shown in FIG. 3A. When the output signal of the deflection amount sensor 202 is the OFF signal, the deflection amount of the recording material P is smaller than the predetermined amount as shown in FIG. 3B, or the recording material P is not in a detection position of the deflection amount detection portion 200.

The deflection amount detection portion 200 may detect at least a state in which the recording material has a first deflection amount and a state in which the recording material has a second deflection amount larger than the first deflection amount. The controller 301 may control a rotation speed of the fixing drive motor 403 based on the deflection amount detection result (detection information) of the deflection amount detection portion 200 so that the deflection amount of the recording material falls within a predetermined range. The controller 301 may calculate an average rotation speed from a detection time of the first deflection amount and a rotation speed therein, and a detection time of the second deflection amount and a rotation speed therein.

Figure 4:
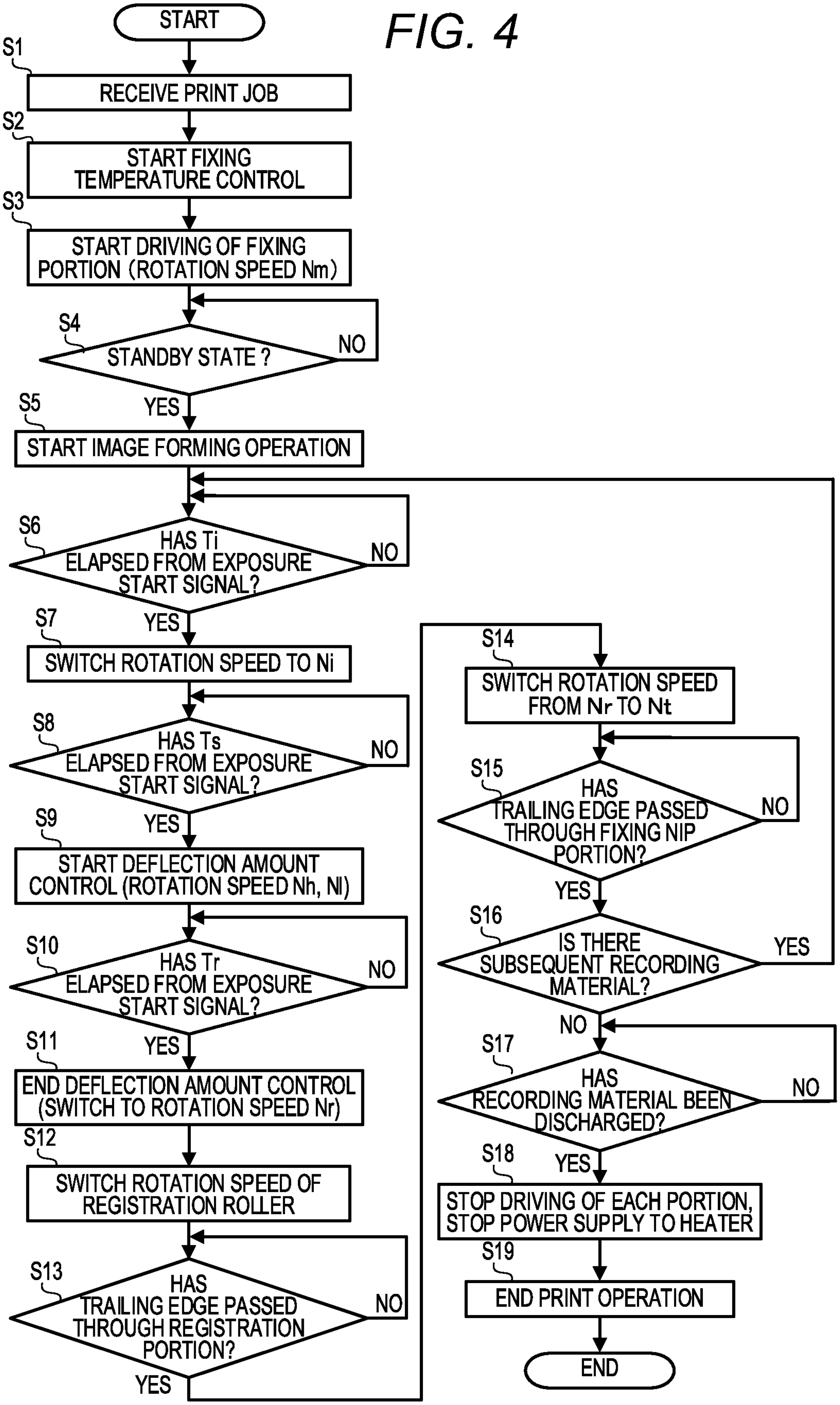
FIG. 4 is a flowchart showing drive control of the fixing portion performed by a controller.

Next, a drive control of the fixing portion 5 by the controller 301 will be described with reference to FIG. 4. FIG. 4 is a flowchart showing the drive control of the fixing portion 5 performed by the controller 301. Upon receiving a print job (S1), the controller 301 outputs the power control signal to the heater 133 to start a fixing temperature control of the fixing roller 131 (S2). Then, the controller 301 starts driving the pressure roller 132 of the fixing portion 5 by the fixing drive motor 403 (S3). At this time, the pressure roller 132 is rotated at a rotation speed Nm. Based on a detection signal of the fixing roller temperature sensor 134, the controller 301 determines whether the fixing portion 5 is in a standby state (S4). Specifically, in a case in which it is detected based on the detection signal of the fixing roller temperature sensor 134 that the surface temperature of the fixing roller 131 has reached a predetermined temperature, it is determined that the fixing portion 5 has entered the standby state.

In a case in which the fixing portion 5 enters the standby state (YES in S4), the controller 301 drives an image formation drive motor 402 (transfer drive portion) that drives the image forming portions 1Y, 1M, 1C, and 1K and the secondary transfer portion 4 to start an image forming operation (S5). As described above, the recording material P is conveyed to the fixing portion 5 after the toner image on the intermediate transfer belt 106 is transferred onto the recording material P by the secondary transfer portion 4. At this time, the controller 301 determines whether a predetermined time Ti has elapsed from an exposure start signal (S6). In a case in which the predetermined time Ti has elapsed from the exposure start signal (YES in S6), the controller 301 switches the rotation speed of the pressure roller 132 of the fixing portion 5 from the rotation speed Nm to a rotation speed Ni (S7). The predetermined time Ti corresponds to a time period from a time when the exposure start signal is output to a time when the leading edge of the recording material P reaches the fixing portion 5. When the pressure roller 132 of the fixing portion 5 is rotated at the rotation speed Ni, a conveyance speed Vi of the recording material P by the fixing portion 5 is slightly slower than a conveyance speed (hereinafter referred to as an intermediate transfer belt speed) Vs of the recording material P by the secondary transfer portion 4. As a result, the recording material P is conveyed in a slightly loosened state between the secondary transfer portion 4 and the fixing portion 5, so that the toner image transferred from the intermediate transfer belt 106 to the recording material P by the secondary transfer portion 4 is prevented from being disturbed. In the embodiment, the rotation speed Ni of the pressure roller 132 is set to 97% of a reference rotation speed N0 of the pressure roller 132 corresponding to the intermediate transfer belt speed Vs. The rotation speed Nm at the start of driving of the pressure roller 132 may be set to the rotation speed Ni so that the rotation speed of the pressure roller 132 is not switched.

When the leading edge of the recording material P reaches the fixing nip portion FN, deflection begins to form in the recording material P due to the speed difference between the conveyance speed of the secondary transfer portion 4 and the conveyance speed of the fixing portion 5. The controller 301 determines whether a predetermined time Ts has elapsed from a time when the exposure start signal is output (S8). At a timing when the predetermined time Ts has elapsed from the time when the exposure start signal is output (YES in S8), the controller 301 starts deflection amount control based on the deflection amount of the recording material P detected by the deflection amount detection portion 200 (S9). In the deflection amount control, the controller 301 selectively switches the rotation speed of the pressure roller 132 between a rotation speed Nh and a rotation speed Nl according to the detection result of the deflection amount detection portion 200. When the pressure roller 132 is rotated at the rotation speed Nh, the conveyance speed of the fixing portion 5 becomes faster than the intermediate transfer belt speed Vs. When the pressure roller 132 is rotated at the rotation speed Nl, the conveyance speed of the fixing portion 5 becomes slower than the intermediate transfer belt speed Vs.

In a case in which the output signal of the deflection amount detection portion 200 is the ON signal, since the deflection amount of the recording material P is larger than the predetermined amount, the rotation speed of the pressure roller 132 is switched to the rotation speed Nh so that the conveyance speed of the fixing portion 5 becomes faster than the intermediate transfer belt speed Vs in order to reduce the deflection amount. In a case in which the output signal of the deflection amount detection portion 200 is the OFF signal, since the deflection amount of the recording material P is smaller than the predetermined amount, the rotation speed of the pressure roller 132 is switched to the rotation speed Nl so that the conveyance speed of the fixing portion 5 is slower than the intermediate transfer belt speed Vs in order to increase the deflection amount. In the embodiment, the rotation speed Nh and the rotation speed Nl of the pressure roller 132 are set at 101% and 95% of the reference rotation speed N0, respectively. Thus, in the deflection amount control, by switching the rotation speed of the pressure roller 132 of the fixing portion 5, the deflection amount of the recording material P is controlled to be approximately constant to the predetermined amount. In the embodiment, the rotation speed of the pressure roller 132 is first switched to the rotation speed Nl at the timing when the predetermined time Ts has elapsed from the time when the exposure start signal is output.

When the deflection amount control is started, the recording material P is conveyed by the registration portion 3, the secondary transfer portion 4, and the fixing portion 5. When the recording material P is further conveyed and the trailing edge of the recording material P passes through the registration portion 3, the recording material P is conveyed by the secondary transfer portion 4 and the fixing portion 5. In the conveyance direction CD, a portion of the recording material P upstream from the fixing portion 5 is nipped by only the secondary transfer portion 4. As described above, since the recording material P is conveyed between the secondary transfer portion 4 and the fixing portion 5 in a slightly loosened state, a restoring force is generated by a bending rigidity of the recording material P. The restoring force of the recording material P acts on the recording material P as a force that pushes a portion of the recording material P in the secondary transfer portion 4 in a direction opposite to the conveyance direction CD. When the recording material P is conveyed by the registration portion 3, the secondary transfer portion 4, and the fixing portion 5, a force generated by a deflection in a portion of the recording material P between the secondary transfer portion 4 and the fixing portion 5 and a force generated by a deflection of a portion of the recording material P between the registration portion 3 and the secondary transfer portion 4 are offset. However, when the trailing edge of the recording material P passes through the registration portion 3, a balance of the forces is lost, and the recording material P may slip against the intermediate transfer belt 106 in the direction opposite to the conveyance direction CD by the force generated by the deflection of the portion of the recording material P between the secondary transfer portion 4 and the fixing portion 5. As a result, a streaky image defect may occur at a position on the leading edge side by a distance between the registration portion 3 and the secondary transfer portion 4 from the trailing edge of the recording material P.

Therefore, in the embodiment, before the trailing edge of the recording material P passes through the registration portion 3, the deflection amount control is completed and the conveyance speed of the fixing portion 5 is switched so that the deflection amount between the secondary transfer portion 4 and the fixing portion 5 is reduced as much as possible. Specifically, the controller 301 determines whether a predetermined time Tr has elapsed from a time when the exposure start signal is output (S10). The predetermined time Tr corresponds to a time period from a time when the exposure start signal is output to a time just before the trailing edge of the recording material P passes through the registration portion 3. At a timing when the predetermined time Tr has elapsed from the time when the exposure start signal is output (YES in S10), the controller 301 ends the deflection amount control (S11). At this timing, the controller 301 switches the rotation speed of the fixing portion 5 from the rotation speed Nh or the rotation speed Nl to a rotation speed Nr so that the conveyance speed of the fixing portion 5 becomes faster than the intermediate transfer belt speed Vs (S11). In the embodiment, the rotation speed Nr is set to 102% of the reference rotation speed N0. In addition, the controller 301 switches a rotation speed Vregi of the registration roller 115 to a lower rotation speed so that the conveyance speed of the recording material P by the registration portion 3 is slower than the intermediate transfer belt speed Vs (S12). This reduces the deflection amount of the portion upstream from the secondary transfer portion 4 of the recording material P and the deflection amount of the portion downstream from the secondary transfer portion 4 of the recording material P, just before the trailing edge of the recording material P passes through the registration portion 3. As a result, a fluctuation in the force acting on the secondary transfer portion 4 before and after the trailing edge of the recording material P passes through the registration portion 3 is suppressed.

The controller 301 determines whether the trailing edge of the recording material P has passed through the registration portion 3 (S13). In a case in which the trailing edge of the recording material P has passed through the registration portion 3 (YES in S13), the rotation speed of the fixing portion 5 is switched from the rotation speed Nr to a rotation speed Nt lower than the reference rotation speed N0 (S14). This prevents the fixing portion 5 from pulling the recording material P by eliminating the deflection of the recording material P between the secondary transfer portion 4 and the fixing portion 5, and controls the deflection amount of the recording material P to an appropriate amount when the trailing edge of the recording material P passes through the secondary transfer portion 4. The rotation speeds Ni, Nh, Nl, Nr, and Nt (first rotation speeds) of the pressure roller 132 of the fixing portion 5 are set based on the reference rotation speed N0 stored as an initial value in a storage portion 302.

After the trailing edge of the recording material P passes through the secondary transfer portion 4, the fixing portion 5 continues to convey the recording material P at the rotation speed Nt. The controller 301 determines whether the trailing edge of the recording material P has passed through the fixing nip portion FN (S15). In a case in which the trailing edge of the recording material P has passed through the fixing nip portion FN (YES in S15), the controller 301 determines whether there is a subsequent recording material P2 (S16). In a case in which there is the subsequent recording material P2 (YES in S16), the controller 301 returns the processing to S6. The controller 301 switches the rotation speed of the fixing portion 5 from the rotation speed Nt to the rotation speed Ni (S7) at a timing (S6) when the predetermined time Ti has elapsed from a time when the exposure start signal for the subsequent recording material P2 is output. On the other hand, in a case in which there is no subsequent recording material P2 (N0 in S16), the controller 301 determines whether the recording material P has been discharged from the discharge portion 141 or the discharge portion 142 (S17). In a case in which it is determined that the recording material P has been discharged from the discharge portion 141 or 142 (YES in S17), the controller 301 stops driving of each portion including the fixing portion 5 and stops the power supply to the heater 133 (S18). The controller 301 ends the print operation (S19).

(Change in Conveyance Speed of Fixing Portion by Thermal Expansion of Pressure Roller and its Effect on Image)

As described above, the rotation speed of the fixing portion 5 is precisely accelerated and decelerated to a predetermined value (rotation speeds Nm, Ni, Nh, Nl, Nr, Nt) sequentially for each of the plurality of conveyance sections according to the conveyance timing (predetermined timing) of the recording material. In the deflection amount control (S9 to S11), the controller 301 controls the rotation speed of the fixing portion 5 based on the deflection amount of the recording material between the secondary transfer portion 4 and the fixing portion 5, that is, the speed difference between the conveyance speed of the recording material by the fixing portion 5 and the conveyance speed of the recording material by the secondary transfer portion 4. However, on the other hand, the conveyance speed of the recording material P by the fixing portion 5 fluctuates greatly due to the thermal expansion of the pressure roller 132. Specifically, the conveyance speed at which the recording material is conveyed by the fixing portion 5 is increased by the thermal expansion of the pressure roller 132 with respect to a predetermined rotation speed.

Figure 5:
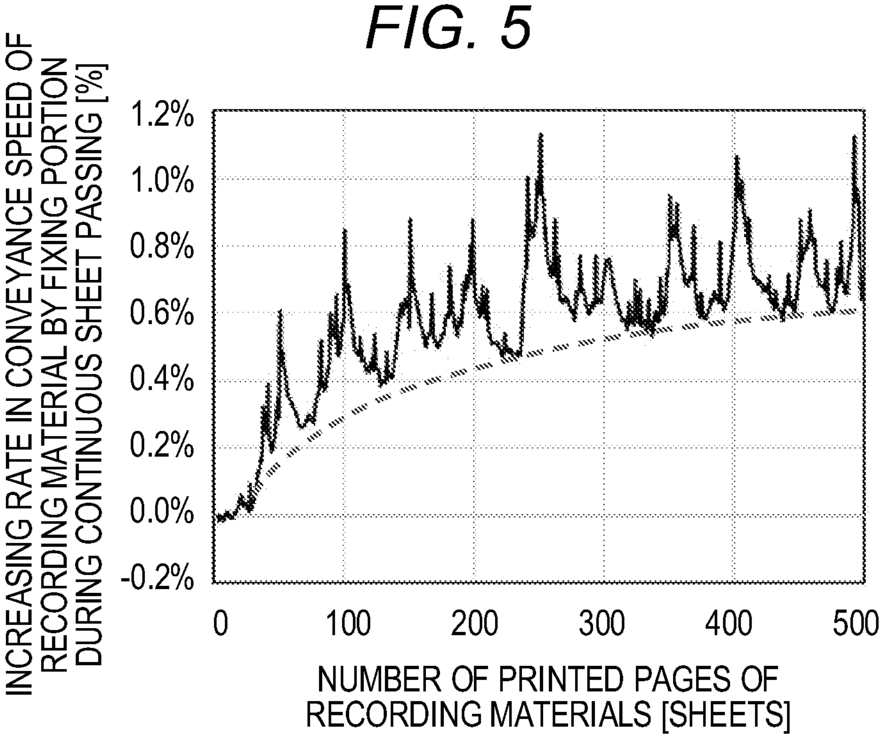
FIG. 5 is a view showing a change in conveyance speed of a recording material by the fixing portion during continuous sheet passing.

FIG. 5 is a view showing a change in the conveyance speed of a recording material by the fixing portion 5 during continuous sheet passing. FIG. 5 shows a transition of the conveyance speed of the recording material by the fixing portion 5 when sheets of a fine paper (A3 size) of 80 gsm (gram per square meter) are continuously fed as the recording material. The vertical axis represents an increasing rate (%) in the conveyance speed of the recording material by the fixing portion 5 during continuous sheet passing. The horizontal axis represents the number of printed pages (sheets)

of the recording material. In a state in which the image forming apparatus 100 is installed in a general office environment (around room temperature of 23° C., humidity of 50%), the temperature control of the fixing portion 5 was started. The conveyance of the recording material was started at a time when the temperature of the fixing portion 5 became a fixable temperature of the toner image. The rotation speed of the pressure roller 132 during continuous sheet passing was controlled to be constant. However, it can be seen from FIG. 5 that the conveyance speed of the recording material by the fixing portion 5 gradually increases soon after the continuous conveyance of the recording material is started. Such a change in the conveyance speed of the recording material by the fixing portion 5 is caused by the gradual thermal expansion of the pressure roller 132 heated by the heater 133. Also, as can be seen from FIG. 5, the conveyance speed of the recording material by the fixing portion 5 shows a change such that the conveyance speed suddenly increases at intervals of about every 50 pages, for example, and then converges to the original gradual increasing trend indicated by the broken line. This means that the pressure roller 132 expanded rapidly when the conveyance speed increased rapidly.

Generally, the image forming apparatus 100 performs various correction operations in order that the image forming portions 1Y, 1M, 1C, and 1K and the conveyance portion of the recording material properly perform the desired operation in response to environmental change and temporal change. For example, the image forming apparatus 100 forms a predetermined toner image (patch) tailored to the purpose of correction on the intermediate transfer belt 106, reads the toner image on the intermediate transfer belt 106 with a reflective optical sensor, calculates a correction amount from an error with respect to a target value, and adjusts a control input value. In addition, the image forming apparatus 100 performs an adjustment operation of an amount of toner supplied to the developing device 112, for example, as an adjustment operation that does not involve the formation of a toner image. For example, when the amount of toner in the developing device 112, which is consumed excessively when forming an image on a recording material, falls below a predetermined amount, the print operation is interrupted, and the toner is intensively supplied from a toner storage container 116 to the developing device 112 to adjust the amount of toner in the developing device 112. Such an adjustment operation is performed when the image forming apparatus 100 is powered on or just before the start of image forming or before the main body of the apparatus stops after the print operation is completed. It is also implemented as interrupt control (hereinafter also referred to as a control between the recording materials) during continuous print operation in order to cope with change in the environment in the image forming apparatus 100 and change in state such as developer due to continuous operation.

Figure 6:
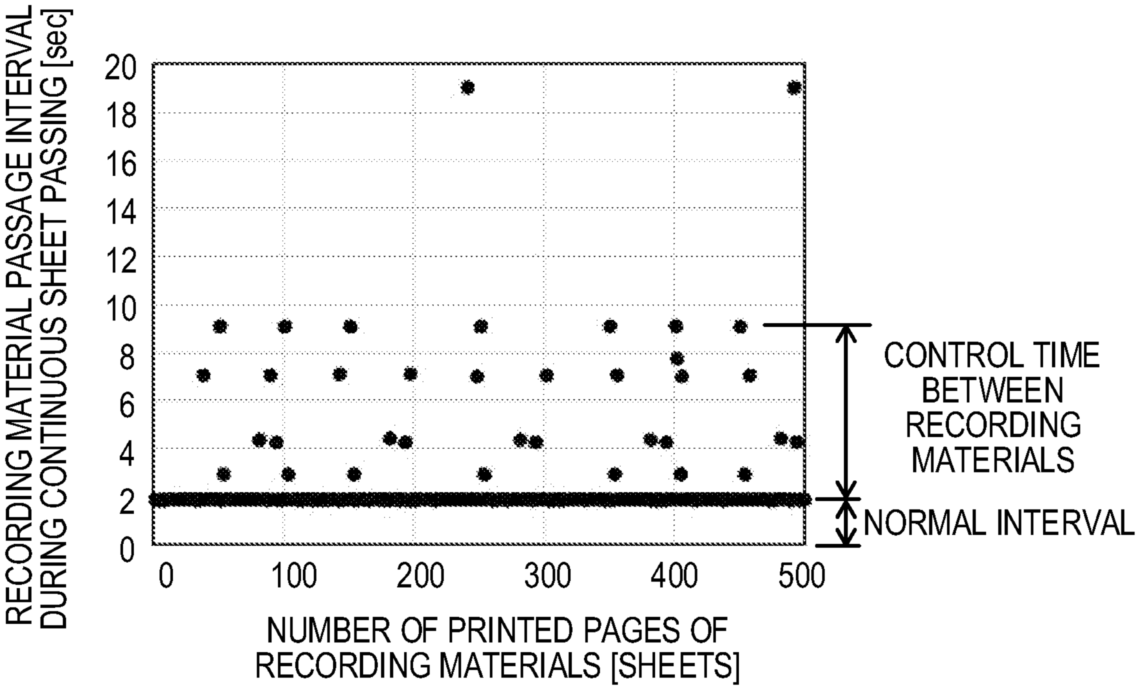
FIG. 6 is a view showing a recording material passage interval during continuous sheet passing.

FIG. 6 is a view showing a recording material passage interval during continuous sheet passing. FIG. 6 shows an interval at which the recording materials pass through the fixing portion 5 (a time interval between a preceding recording material and a subsequent recording material). The vertical axis represents the recording material passage interval (seconds) during continuous sheet passing. The horizontal axis represents the number of printed pages (sheets) of the recording materials. As can be seen from FIG. 6, the interval between the preceding recording material and the subsequent recording material is sporadically larger than that in a normal time when the recording material passage interval is about 2 seconds. In FIG. 6, a time for a portion by which the recording material passage interval is longer than the recording material passage interval (normal interval) in the normal time corresponds to a control time between the recording materials. It can be seen from FIG. 5 and FIG. 6 that the conveyance speed of the fixing portion 5 is increased at a timing when the interval between the preceding recording material and the subsequent recording material becomes wider. This is caused by the following reasons. For the recording material passage interval in the normal time, most of an inflow heat amount by the heater 133 is taken away one after another by the continuously conveyed recording materials. On the other hand, during the control between the recording materials, since the recording material P does not pass through the fixing portion 5, the pressure roller 132 is continuously heated by the heating of the heater 133 and the heat amount of the fixing roller 131. With this, the pressure roller 132 expands and the conveyance speed of the fixing portion 5 increases. In consideration of such effects, in a case in which the passage of the subsequent recording material is delayed by a predetermined time or more, control may be performed to reduce or stop the power supply to the heater 133. However, once heated, the heater 133 and the fixing roller 131 are not cooled immediately, so the surface temperature of the pressure roller 132 also rises. As a result, the pressure roller 132 expands rapidly during the control between the recording materials, so that the conveyance speed of the recording material by the fixing portion 5 after the control between the recording materials is temporarily increased. Then, by continuously conveying the recording materials at the normal interval, the temperature of the pressure roller 132 gradually decreases to the original temperature, and the conveyance speed of the recording material by the fixing portion 5 also changes to return to the original gradual acceleration transition.

In the embodiment, a diameter of the pressure roller 132 is 30 mm and a thickness of the rubber layer is about 3 mm. The change in the conveyance speed of the fixing portion 5 is about 0.75% at a slow speed increase, about 0.3% temporarily at a time of the control between the recording materials of about 10 seconds, and about 0.6% at a time of the control between the recording materials of about 20 seconds. A distance from the secondary transfer portion 4 to the fixing portion 5 is 100 mm. A distance by which the fixing portion 5 conveys the recording material between a time when a leading edge of an A3 size recording material (length in the conveyance direction of 420 mm) reaches the fixing portion 5 and a time when a trailing edge of the A3 size recording material passes through the secondary transfer portion 4 increases by 3.2 mm when the conveyance speed of the fixing portion 5 increases by 1%.

In order not to disturb the transfer of the toner image from the intermediate transfer belt 106 to the recording material in the secondary transfer portion 4 as described above, the recording material is conveyed in a slightly loosened state between the secondary transfer portion 4 and the fixing portion 5. Therefore, even in a case in which the conveyance speed at the fixing portion 5 changes due to the thermal expansion of the pressure roller 132, it is designed that the fluctuation in the conveyance distance of the recording material by the fixing portion 5 is absorbed by the deflection of the recording material, and the fixing portion 5 does not pull the recording material during secondary transfer.

However, in order to allow a large fluctuation in the conveyance speed of the fixing portion 5, it is necessary to set the deflection of the recording material between the secondary transfer portion 4 and the fixing portion 5 to a large amount. When the recording material is conveyed in the loosened state as described above, the force in the direction opposite to the conveyance direction CD acts on the secondary transfer portion 4 by the restoring force due to the bending rigidity of the recording material. Similarly, the restoring force of the recording material acts on the fixing portion 5 as the force in the conveyance direction CD. However, in the fixing portion 5, the pressure roller 132 is strongly pressed against the fixing roller 131, and a nip force for nipping the recording material is larger than that of the secondary transfer portion 4. For this reason, especially in the case of a recording material with high bending rigidity (e.g., thick paper), the restoring force of the recording material to the deflection amount is large, and slippage easily occurs between the intermediate transfer belt 106 and the recording material P in the secondary transfer portion 4.

In a case in which slippage occurs between the intermediate transfer belt 106 and the recording material and a relative speed difference occurs between the intermediate transfer belt 106 and the recording material, a length of the toner image transferred onto the recording material P changes with respect to a length of the toner image on the intermediate transfer belt 106 in the conveyance direction CD. That is, a magnification of the image on the recording material in the conveyance direction CD changes. When the recording material is pushed back against the intermediate transfer belt 106 by the restoring force of the recording material and the conveyance speed of the recording material by the secondary transfer portion 4 becomes slower than the conveyance speed of the intermediate transfer belt 106, the length of the image on the recording material in the conveyance direction CD becomes shorter. In addition, when the slippage between the intermediate transfer belt 106 and the recording material P suddenly changes, the image is locally expanded and contracted so that a streaky image defect may occur. In addition, when the trailing edge of the recording material passes through the secondary transfer portion 4 in a state in which the recording material has an excessive bending between the secondary transfer portion 4 and the fixing portion 5, the holding of the recording material is released and the attitude of the recording material changes abruptly. At this time, there is a possibility that a malfunction may occur, such as the toner adhering to a cut end face (cut surface) of the trailing edge of the recording material and staining (cut end face staining), or the toner image before fixing may be disturbed.

In this way, the deflection amount of the recording material between the secondary transfer portion 4 and the fixing portion 5 cannot be set excessively large, and it is desirable that the deflection amount of the recording material be managed and controlled with precision. For this purpose, it is necessary to suppress the fluctuation in the conveyance speed of the fixing portion 5 with respect to the conveyance speed of the secondary transfer portion 4.

(Rotation Speed Correction for Fixing Portion Based on Deflection Amount Control Result)

According to the embodiment, an average rotation speed Nave as an average value of the rotation speed of the pressure roller 132 of the fixing portion 5 can be calculated from a conveyance speed switching control operation of the fixing portion 5 in the deflection amount control based on the deflection amount detection result of the recording material P. As described above, in the control operation of steps S9 to S11 shown in FIG. 4, the controller 301 switches the rotation speed of the pressure roller 132 between the rotation speed Nh and the rotation speed Nl according to the detection result of the deflection amount detection portion 200. At the same time, the controller 301 calculates an integrated driving time Th by integrating a driving time (rotation time) at the rotation speed Nh and an integrated driving time Tl by integrating a driving time (rotation time) at the rotation speed Nl. The integrated driving time Tl is an integrated time of the driving time (detection time) for driving the fixing portion 5 at the rotation speed Nl in a state in which the recording material has the first deflection amount. The integrated driving time Th is an integrated time of the driving time (detection time) for driving the fixing portion 5 at the rotation speed Nh in a state in which the recording material has the second deflection amount larger than the first deflection amount. From the rotation speed Nh, the rotation speed Nl, the integrated driving time Th, and the integrated driving time Tl, the controller 301 determines the average rotation speed Nave of the pressure roller 132 during the deflection amount control by the following Equation (1).

$$Nave = \frac{NhTh + NlTl}{Th + Tl} \qquad \text{Equation (1)}$$

The integrated driving time Th and the integrated driving time Tl are obtained by integrating the driving times in the control operation from step S9 to step S11, respectively. In the embodiment, the deflection amount control is started at the timing when the predetermined time Ts has elapsed from the time when the exposure start signal is output, and is ended at the timing when the predetermined time Tr has elapsed from the time when the exposure start signal is output. Therefore, the integrated driving time Th, the integrated driving time Tl, the predetermined time Ts, and the predetermined time Tr satisfy the relationship shown by the following Equation (2).

$$Th + Tl = Tr - Ts \qquad \text{Equation (2)}$$

Since the average rotation speed Nave is a result of the control operation in which the deflection amount of the recording material P between the secondary transfer portion 4 and the fixing portion 5 becomes approximately constant, it can be said that the average rotation speed Nave corresponds to the intermediate transfer belt speed Vs in a state of the fixing portion 5, that is, the pressure roller 132, at that time. Therefore, the preset reference rotation speed N0 of the pressure roller 132 is corrected by a correction value ΔN0, which is a difference between the average rotation speed Nave and the reference rotation speed N0. At the same time, the correction value ΔN0 for the reference rotation speed N0 previously stored in the storage portion 302 is stored in the storage portion 302.

However, the calculation of the correction value ΔN0 for the reference rotation speed N0 based on the result of the control operation from step S9 to the step S1*l* with respect to the first recording material P1 is not in time for the control operation (rotation speeds Nr and Nt) from step S1*l* onwards for the same recording material P1. Therefore, the calculated correction value ΔN0 is used as a correction value for the rotation speeds Ni, Nr, and Nt (second rotation speed) with respect to the second recording material P2. Similarly, a new correction value ΔN0 calculated from the result of the control operation for the second recording material P2 is used as a correction value for the rotation speeds Ni, Nr, and Nt with respect to the third recording material P3.

That is, the controller 301 performs the control such that the longer the interval between the trailing edge of the preceding recording material and the leading edge of the subsequent recording material passing through the fixing portion 5, the larger the difference of the second rotation speed for conveying the subsequent recording material with respect to the first rotation speed for conveying the preceding recording material.

In the embodiment, the rotation speed for the subsequent recording material is corrected using the result of the control operation for one preceding recording material. However, for example, the rotation speed for the subsequent recording material may be corrected based on the result of the control operation for a plurality of preceding recording materials. In the embodiment, the rotation speeds Ni, Nr, and Nt for the subsequent recording material are corrected based on the result of the control operation for the preceding recording material. However, the rotation speed Nh and the rotation speed Nl in performing the deflection amount control for the subsequent recording material need not necessarily be corrected based on the result of the control operation for the preceding recording material. This is because a ratio of the integrated driving time Tl of the rotation speed Nl to the integrated driving time Th of the rotation speed Nh varies, so that the average rotation speed Nave is not significantly affected. However, if the change in the conveyance speed of the recording material by the fixing portion 5 becomes excessive, the deflection amount cannot be controlled to be nearly constant. Therefore, in this case, correction of the rotation speed Nh and the rotation speed Nl in the deflection amount control is required.

It is possible to calculate the correction value ΔN0 for the reference rotation speed N0 of the fixing portion 5 each time one sheet of recording material is passed through the fixing portion 5. However, in a case in which the correction value ΔN0 is an excessively minute value, the effect of the correction cannot be substantially obtained. Therefore, a threshold value for the correction value ΔN0 may be provided. In a case in which the correction value ΔN0 is equal to or less than the threshold value, correction may be withheld. However, as mentioned above, in the case of a recording material such as a thick paper or a wide width paper having a large restoring force of the recording material with respect to the deflection amount (the bending rigidity in the conveyance direction CD of the recording material is large), the correction value ΔN0 tends to affect the image more easily than in the case of a soft recording material. Therefore, the rotation speed of the fixing portion 5 may be corrected at an appropriate frequency by switching the threshold value according to the type or paper width of recording material to be printed.

As described above, the average rotation speed Nave of the pressure roller 132 can be calculated based on the deflection amount detection result of the recording material between the secondary transfer portion 4 and the fixing portion 5. From the average rotation speed Nave, the correction value for the rotation speed of the pressure roller 132 corresponding to the state of the pressure roller 132 at that time can be calculated. The rotation speed of the pressure roller 132 of the fixing portion 5 can be corrected based on the correction value ΔN0.

(Rotation Speed Correction for Fixing Portion Based on Recording Material Passage Interval)

As mentioned above, the correction of the rotation speed of the fixing portion 5 for the subsequent recording material based on the deflection amount detection result with respect to the preceding recording material works effectively against and can offset the gradual increasing trend shown by the dashed line in FIG. 5. However, the above-mentioned correction for the rotation speed cannot be applied to the case where the interval between the preceding recording material and the subsequent recording material becomes wider than the normal interval by the control between the recording materials being performed, the pressure roller 132 suddenly expands thermally, and the conveyance speed of the fixing portion 5 becomes discontinuously faster. Therefore, in the embodiment, the rotation speed of the fixing portion 5 is corrected based on the recording material passage interval.

Figure 7:
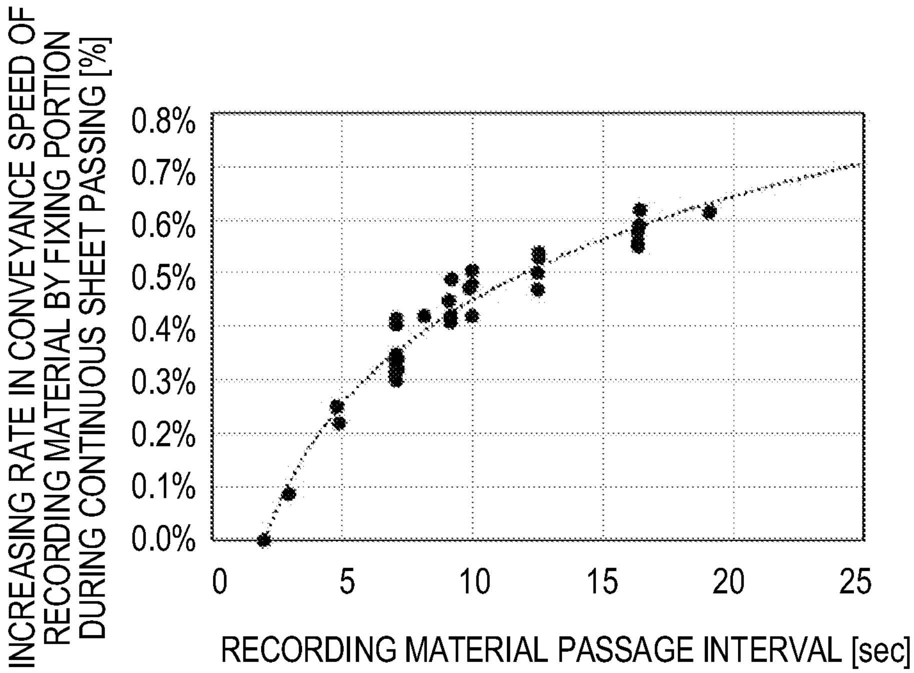
FIG. 7 is a view showing a relationship between the recording material passage interval during continuous sheet passing and an increasing rate in the conveyance speed of the fixing portion.

FIG. 7 is a view showing a relationship between the recording material passage interval during continuous sheet passing and an increasing rate in the conveyance speed of the fixing portion 5. The vertical axis represents the increasing rate (%) in the conveyance speed of the recording material by the fixing portion 5 during continuous sheet passing. The horizontal axis represents the recording material passage interval (seconds). The recording material passage interval is an interval between the recording materials (an interval between a preceding recording material and a subsequent recording material) passing through the fixing portion 5 during continuous sheet passing as shown in FIG. 6. As can be seen from FIG. 7, the increasing rate in the conveyance speed of the subsequent recording material with respect to the conveyance speed of the preceding recording material by the fixing portion 5 increases with the increase in the recording material passage interval, and the increasing rate in the conveyance speed is gradually moderated with respect to the increase in the recording material passage interval. Therefore, by using the relationship shown in FIG. 7, the increasing rate in the conveyance speed of the subsequent recording material is estimated from the recording material passage interval, and the rotation speed of the fixing portion 5 is reduced to offset the increase in the conveyance speed. For example, it is assumed that the recording material passage interval is 10 seconds by performing the control between the recording materials. At this time, it can be estimated in advance from the relationship shown in FIG. 7 that if the subsequent recording material is conveyed at the same rotation speed of the pressure roller 132 that conveys the preceding recording material, the conveyance speed of the subsequent recording material becomes about 0.45% faster than the conveyance speed of the preceding recording material. Therefore, the increase in the conveyance speed due to the thermal expansion of the pressure roller 132 can be offset by reducing the fixing rotation speed by 0.45% before the subsequent recording material reaches the fixing nip portion FN.

Figure 8A:
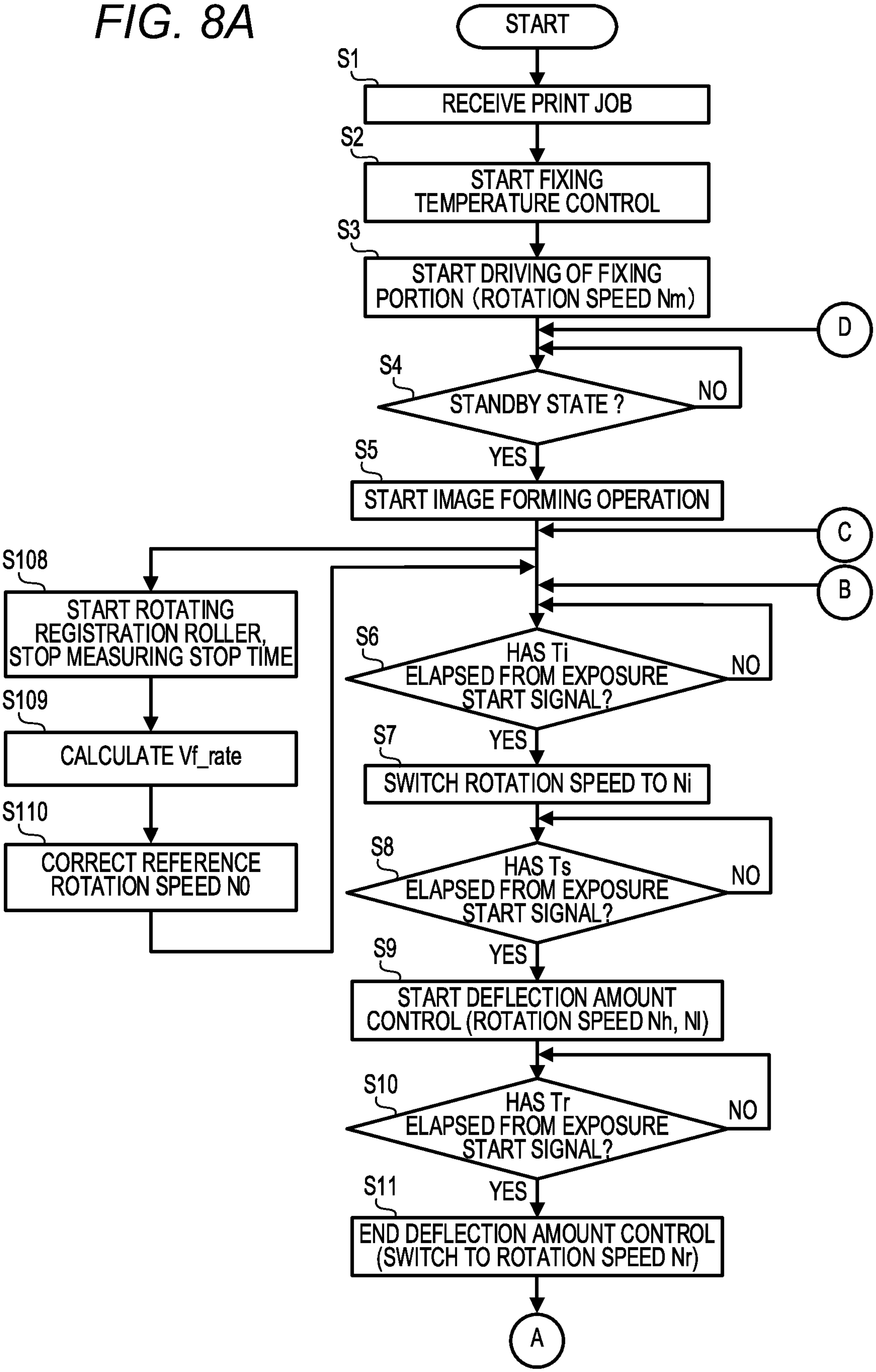
FIG. 8A and FIG. 8B are flowcharts showing a control operation of rotation speed correction for the fixing portion based on the recording material passage interval.
Figure 8B:
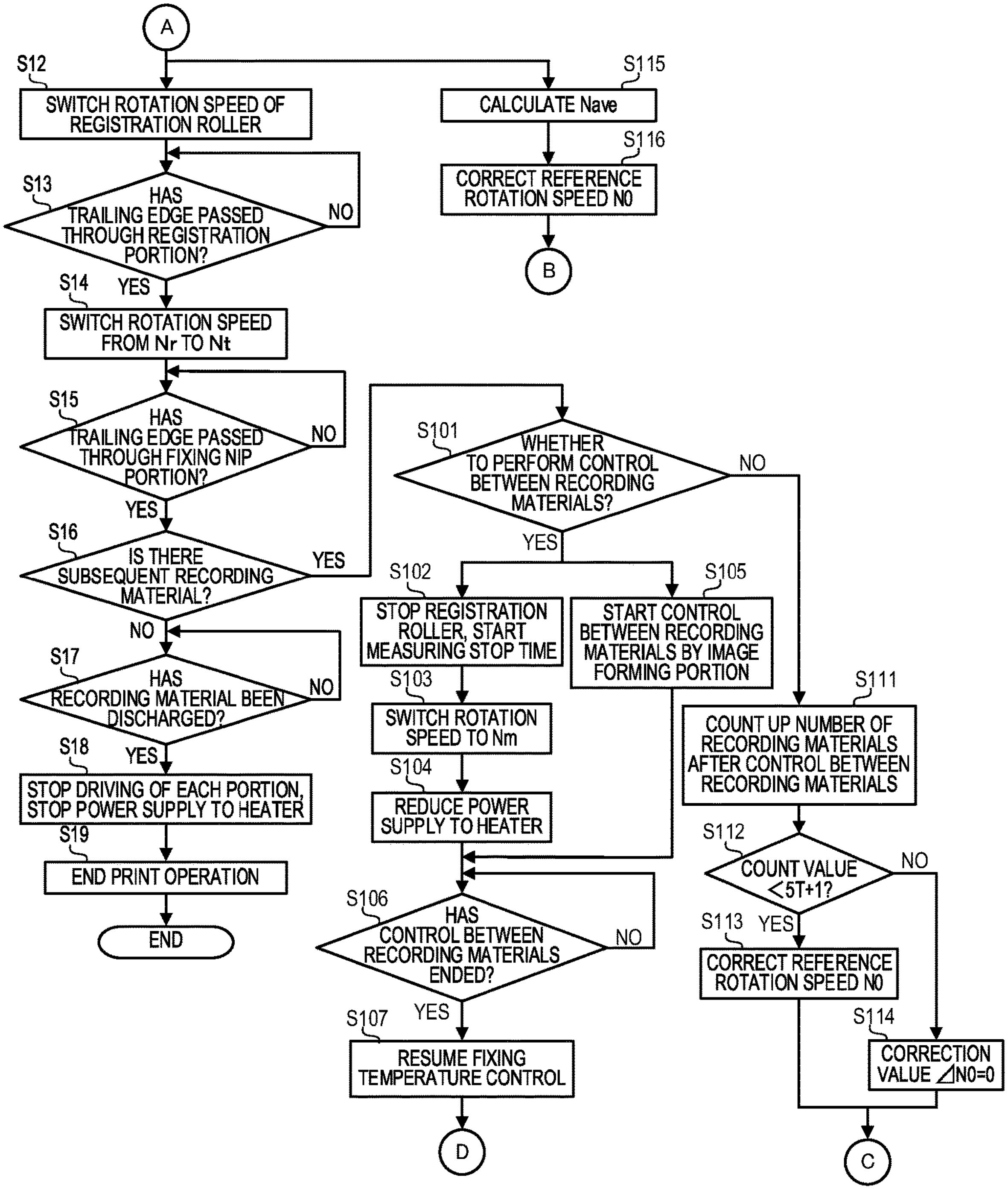

FIG. 8A and FIG. 8B are flowcharts showing a control operation of rotation speed correction for the fixing portion 5 based on the recording material passage interval. In FIG. 4, a case in which the first recording material is conveyed from the start of the print operation is shown as an example of the drive control of the fixing portion. However, in a case in which the recording material passage interval of a successive recording material following the first recording material is the normal interval during continuous operation, the drive control is the same as that shown in FIG. 4. In FIG. 8A and FIG. 8B, the same steps as in FIG. 4 are designated by the same symbols, and the detailed explanation is omitted.

The steps S1 to S19 in FIG. 8A and FIG. 8B are the same as the steps S1 to S19 in FIG. 4, so their explanations are omitted. Referring to FIG. 8B, in S16, the controller 301 determines whether there is a subsequent recording material. In a case in which there is a subsequent recording material (YES in S16), the controller 301 advances the processing to S101. The controller 301 determines whether to perform the control between the recording materials (S101). In a case in which the controller 301 determines that the control between the recording materials is to be performed between the i-th recording material and the j-th (j=i+1) recording material in the continuous print operation to the plurality of recording materials (YES in S101), the process proceeds to S102 and S105. After the i-th recording material Pi passes through the registration portion 3, the controller 301 stops the registration roller 115 (S102) and temporarily interrupts feeding of the j-th recording material Pj to the secondary transfer portion 4. At the same time, the controller 301 starts measuring a stop time of the registration roller 115 (S102).

After a trailing edge of the i-th recording material Pi passes through the fixing nip portion FN, the controller 301 switches the rotation speed of the pressure roller 132 of the fixing portion 5 to the rotation speed Nm at a predetermined timing (S103). The controller 301 reduces the power supply to the heater 133 as the temperature control during the control between the recording materials (S104). On the other hand, after the image forming portions 1Y, 1M, 1C, and 1K form toner images on the recording material Pi, the controller 301 subsequently starts the control operation between the recording materials by the image forming portions 1Y, 1M, 1C, and 1K (S105). In the control between the recording materials, for example, a predetermined toner image (patch) tailored to the purpose of correction is formed on the intermediate transfer belt 106. The toner image on the intermediate transfer belt 106 is read by the reflective optical sensor, and a correction amount is calculated from an error of a reading value with respect to the target value. The controller 301 adjusts the control input based on the correction amount. The controller 301 determines whether the control between the recording materials has been ended (S106). In a case in which the control between the recording materials has been ended (YES in S106), the controller 301 resumes the power supply to the heater 133 to heat the fixing roller 131 and resumes the fixing temperature control (S107). The controller 301 returns the processing to S4.

Referring to FIG. 8A, in the case in which the standby state of the fixing portion 5 has been detected (YES in S4), the image forming operation to the j-th recording material Pj is started (S5). When the image forming operation to the j-th recording material Pj is started (S5), the controller 301 advances the processing to S108. The controller 301 starts the rotation of the registration roller 115 and stops measuring the stop time of the registration roller 115 (S108). A rotation start timing of the registration roller 115 is adjusted by counting backward from a time period from the time when the exposure start signal is output to a time when the toner image reaches the secondary transfer portion 4 and a conveyance time period for which the recording material is conveyed from the registration portion 3 to the secondary transfer portion 4. When the rotation of the registration roller 115 is started, the conveyance of the recording material Pj is started. At this time, the controller 301 stops the measurement of the stop time of the registration roller 115 which is started in step S102, and calculates the stop time as the recording material passage interval. From a difference between the stop time of the registration roller 115 as the recording material passage interval calculated here and a stop time as the normal interval during continuous sheet passing, the control time between the recording materials required for the control between the recording materials is calculated.

The controller 301 calculates an increasing rate Vf_rate of the conveyance speed by the fixing portion 5 based on the recording material passage interval from the relationship shown in FIG. 7 stored in the storage portion 302 (S109). The reference rotation speed N0($j$) of the fixing portion 5 with respect to the recording material Pj immediately after the control between the recording materials is set according to the following Equation (3), and the reference rotation speed N0 is corrected (S110).

$$N0(j) = \frac{N0(i)}{1 + \mathrm{Vf\_rate}} \qquad \text{Equation (3)}$$

Here, N0($i$) is the reference rotation speed of the fixing portion 5 with respect to the recording material Pi immediately before the control between the recording materials. By setting the reference rotation speed N0($j$) of the fixing portion 5 with respect to the recording material Pj, the reference rotation speed of the fixing portion 5 is corrected from the reference rotation speed N0($i$) to the reference rotation speed N0($j$). Since the reference rotation speed of the fixing portion 5 with respect to the recording material Pj is corrected to the reference rotation speed N0($j$), the rotation speed of the fixing portion 5 to be switched in subsequent steps is set low to offset the increase in speed caused by the thermal expansion of the pressure roller 132. In the embodiment, since the rotation speeds Ni, Nr, and Nt of the fixing portion 5 are set as ratios to the reference rotation speed N0, the rotation speeds Ni, Nr, and Nt are corrected by correcting the reference rotation speed N0. The value (initial value) stored in the storage portion 302 as the reference rotation speed N0 of the fixing portion 5 is not rewritten, but the difference between the reference rotation speed N0($j$) obtained from Equation (3) and the initial reference rotation speed N0 is stored in the storage portion 302 as the correction value ΔN0.

Although FIG. 7 shows the relationship between the recording material passage interval and the increasing rate in the conveyance speed of the recording material by the fixing portion 5, this relationship differs depending on the materials and the configuration of the fixing portion 5, and therefore, the embodiment is not limited to the values and curves shown in FIG. 7. In addition, even at the same fixing portion 5, the relationship shown in FIG. 7 changes according to the supply power amount (supply heat amount) to the heater 133 during the control between the recording materials and the temperature of the fixing roller 131 during the passage of the recording material (supply power amount to the heater 133 during the passage of the recording material). Therefore, in the case in which the supply power amount varies according to the type of recording material, it is better to store in the storage portion 302 the relationship between the recording material passage interval and the increasing rate in the conveyance speed of the recording material by the fixing portion 5 according to the supply power amount. In the case in which the reference rotation speed N0 of the fixing portion 5 is corrected, it is better to correct the reference rotation speed N0 by switching the relationship between the recording material passage interval and the increasing rate in the conveyance speed of the recording material by the fixing portion 5 according to the supply power amount.

The recording material passage interval when the control between the recording materials is performed is obtained from the stop time of the registration roller 115. However, this is not the only method for obtaining the recording material passage interval. The recording material passage interval may be obtained from an interval of the rotation start timings at which the registration roller 115 starts to rotate in order to convey the recording material to the secondary transfer portion 4, or from an interval of stop timings at which the registration roller 115 stops after the recording material passes. Also, the recording material passage interval may be obtained by using a time period from the time when the exposure start signal for the recording material Pi immediately before the control between the recording materials is output to the time when the exposure start signal for the recording material Pj immediately after the control between the recording materials is output.

Also, the recording material passage interval may be obtained by measuring a passage interval between the recording material Pi and the recording material Pj at a predetermined position. For example, a recording material sensor 151 (recording material leading edge detection unit) may be provided on the conveyance path 6 from the registration portion 3 to the fixing portion 5. The recording material sensor 151 may detect the passage timings of the leading edge of the recording material Pi and the leading edge of the recording material Pj, and the recording material passage interval may be obtained based on the detection result. Also, a recording material sensor 152 (recording material trailing edge detection unit) may be provided on the conveyance path 7 from a position of the trailing edge of the recording material waited at the registration portion 3 to the secondary transfer portion 4. The recording material sensor 152 may be provided on the conveyance path 7 from a position upstream from the registration portion 3 by the length of the recording material in the conveyance direction CD to the secondary transfer portion 4. The recording material sensor 152 detects passage timings of the trailing edge of the recording material Pi and the trailing edge of the recording material Pj, and the recording material passage interval may be obtained based on the detection result. However, in the case in which the passage timing of the leading edge or the trailing edge of the recording material is used, the processing from the detection of the passage timing to the correction of the reference rotation speed may be completed at least before the leading edge of the recording material reaches the fixing nip portion FN.

For the k-th (k=j+1) recording material Pk following the j-th recording material Pj, the recording material passage interval returns to the normal interval. Therefore, the increasing rate in the conveyance speed of the k-th recording material Pk with respect to the conveyance speed of the j-th recording material Pj calculated based on the recording material passage interval is 0%. However, the pressure roller 132 thermally expanded during the control between the recording materials may not return to the state before the control between the recording materials by passing only one sheet of recording material Pj through the pressure roller 132. Therefore, in order to offset the increase in the conveyance speed of the fixing portion 5 appropriately with respect to the second and subsequent recording materials after the control between the recording materials, correction is made according to the number of recording material passages from the control between the recording materials.

The pressure roller 132, which is temporarily heated in the control between the recording materials, then gradually returns to its original temperature, and the change in temperature of the pressure roller 132 in this case can be regarded as an impulse response of the first-order delay system. Here, the increasing rate in the conveyance speed of the subsequent recording material Pk with respect to the conveyance speed of the first recording material Pj after the control between the recording materials is defined as Vf_rate (1). In a case in which the recording materials are conveyed at the normal interval (approximately the same time interval) after the control between the recording materials, the increasing rate Vf_rate (n) in the conveyance speed of the n+1th recording material Pj+n+1 with respect to the n-th recording material Pj+n after the control between the recording materials is expressed by the following Equation (4).

$$\mathrm{Vf\_rate}(n) = \mathrm{Vf\_rate}(1)\exp\left(-\frac{n-1}{T}\right),\ \text{where } n > 1 \qquad \text{Equation (4)}$$

Here, the increasing rate Vf_rate (1) is the result calculated in step S109. A constant T is a time constant and a parameter that determines a speed reduction rate exp (−1/T) for each sheet of recording material conveyed after the control between the recording materials. From Equation (4), the conveyance speed by the pressure roller 132 returns to the original conveyance speed approximately at 5T+1th sheet. The constant T is experimentally obtained in advance and stored in the storage portion 302.

Even in a case in which a plurality of recording materials are continuously conveyed at approximately the same time interval to perform an image formation, the controller 301 may gradually change the rotation speed of the fixing portion 5 to either increase or decrease according to the number of recording material passages. In addition to this, the controller 301 may control to reduce a total change amount in the rotation speed of the fixing portion 5, which is changed while a predetermined number of recording materials are passed through the fixing portion 5 at approximately the same time interval, as the number of recoding material passages increases.

In FIG. 8B, after the j-th recording material Pj passes through the fixing nip portion FN, the controller 301 counts up the number of recording materials conveyed after the control between the recording materials (S111). The controller 301 determines whether a count value of the number of recording materials conveyed after the control between the recording materials is less than 5T+1 (S112). In a case in which the count value of the number of recording materials conveyed after the control between the recording materials is less than 5T+1 (YES in S112), the controller 301 advances the processing to S113. The controller 301 calculates, by the following Equation (5) and Equation (6), the increasing rate Vf_rate(n) in the conveyance speed of the fixing portion 5 and the reference rotation speed N0(*n*) of the fixing portion 5 for each sheet of recording material conveyed, and corrects the reference rotation speed N0 of the fixing portion 5 (S113).

$$\mathrm{Vf\_rate}(n) = \mathrm{Vf\_rate}(n-1)\exp\left(-\frac{1}{T}\right) \qquad \text{Equation (5)}$$

$$N0(n) = \frac{N0(n-1)}{1 + \mathrm{Vf\_rate}(n)} \qquad \text{Equation (6)}$$

As a result, the increase in the conveyance speed of the fixing portion 5 can be properly offset for the second and subsequent recording materials after the control between the recording materials. The controller 301 then returns the processing to S6. On the other hand, in a case in which the count value of the number of recording materials conveyed after the control between the recording materials is 5T+1 or more (NO in S112), the controller 301 advances the processing to S114. For the 5T+1th recording material and subsequent recording materials after the control between the recording materials, even if the calculation in step S113 is repeated, Vf_rate(n)≈0, and the reference rotation speed N0 of the fixing portion 5 is hardly updated. Therefore, the controller 301 sets the correction value ΔN0 to 0 (ΔN0=0) (S114). The controller 301 then returns the processing to S6. After the deflection amount control is performed in S9 to S11, the controller 301 calculates the average rotation speed Nave of the pressure roller 132 from Equation (1) based on the deflection amount detection result (S115). The controller 301 calculates a correction value ΔN0, which is a difference between the average rotation speed Nave and the reference rotation speed N0, and corrects the reference rotation speed N0 (S116). Therefore, the reference rotation speed N0 converges to the average rotation speed Nave.

That is, in a case in which the image formation on a plurality of recording materials is further continued after the interval between the trailing edge of the preceding recording material and the leading edge of the subsequent recording material passing through the fixing portion 5 becomes longer by the control between the recording materials, the controller 301 performs the above-mentioned control. With this, the controller 301 changes the rotation speed of the fixing portion 5 with respect to the plurality of recording materials conveyed by the fixing portion 5 after the recording material passage interval in the fixing portion 5 becomes long so that the rotation speed becomes higher from the second rotation speed each time one recording material is conveyed. Thus, the rotation speed of the fixing portion 5 converges toward the first rotation speed. The controller 301 controls the fixing drive motor 403 so that a change width (speed increasing amount) of increasing the rotation speed of the fixing portion 5 each time one recording material is conveyed from the recording materials conveyed at the second rotation speed by the fixing portion 5 becomes smaller each time one recording material is conveyed.

While the recording material from the leading edge to the trailing edge is conveyed by the fixing portion 5, the controller 301 sequentially switches the rotation speed of the fixing portion 5 for each of the plurality of conveyance sections according to the predetermined timing. In the case of forming images on a plurality of recording materials, if the interval between the trailing edge of the preceding recording material and the leading edge of the subsequent recording material passing through the fixing portion 5 becomes longer, the controller 301 performs the following control. The controller 301 controls in such manner that a rotation speed for at least one conveyance section among the rotation speeds (Ni, Nh, Nl, Nr, Nt) of each conveyance section by the fixing portion 5 with respect to the subsequent recording material becomes lower than a rotation speed for the same conveyance section with respect to the preceding recording material.

In the case in which the plurality of recording materials are continuously conveyed at approximately the same time interval to perform the image formation, the controller 301 may control the rotation speed of the fixing portion 5 when the subsequent recording material is conveyed based on the conveyance speed detection result of the preceding recording material obtained from the deflection amount detection result of the deflection amount detection portion 200. In the case in which the interval between the trailing edge of the preceding recording material and the leading edge of the subsequent recording material passing through the fixing portion 5 becomes longer, the controller 301 may control in such a manner that the rotation speed of the fixing portion 5 when conveying the subsequent recording material becomes lower than the rotation speed of the fixing portion 5 when conveying the preceding recording material.

The rotation speed of the fixing portion 5, which is changed by the controller 301 according to the interval between the trailing edge of the preceding recording material and the leading edge of the subsequent recording material passing through the fixing portion 5, may include at least one of the rotation speeds Ni, Nr, and Nt. The rotation speeds Ni, Nr, and Nt are rotation speeds in other conveyance sections than the conveyance sections in which the rotation speed of the fixing portion 5 is changed to the rotation speed Nh or Nl based on the deflection amount detection result (detection information) of the deflection amount detection portion 200 so that the deflection amount of the recording material falls within the predetermined range.

According to the first embodiment, even if the pressure roller 132 is thermally expanded rapidly due to the recording material passage interval being longer than the normal interval by the control between the recording materials, the rotation speed of the pressure roller 132 can be corrected to stabilize the conveyance speed of the recording material by the fixing portion 5. According to the first embodiment, the rotation speed of the fixing portion 5 can be controlled according to the change in the recording material passage interval.

Second Embodiment

The second embodiment will be described below. In the second embodiment, the same structures as in the first embodiment are denoted by the same reference symbols and the explanations thereof are omitted. The configuration and operation of the image forming apparatus 100 and the fixing drive control according to the conveyance timing of the recording material in the second embodiment are the same as in the first embodiment, so the explanations thereof are omitted. The rotation speed correction for the fixing portion 5 in the second embodiment is different from that in the first embodiment. The difference will be mainly described below.

(Rotation Speed Correction for Fixing Portion Based on Temperature Estimation of Pressure Roller)

As mentioned above, the correction of the conveyance speed of the subsequent recording material based on the deflection amount detection result of the preceding recording material works effectively against the gradual increasing trend shown by the dashed line in FIG. 5, and can offset the increase in the conveyance speed caused by the expansion of the pressure roller 132. However, for a recording material of which the length in the conveyance direction CD is not so long with respect to the distance from the secondary transfer portion 4 to the fixing portion 5, for example, the trailing edge passes through the secondary transfer portion 4 soon after the leading edge of the recording material reaches the fixing portion 5. Therefore, the conveyance section (control time from S9 to S11 in FIG. 4 or FIG. 8A) in which the control is performed by switching the two rotation speeds Nh and N1 based on the deflection amount detection result of the recording material extending over the secondary transfer portion 4 and the fixing portion 5 cannot be sufficiently secured. As a result, the deflection amount of the recording material becomes unstable and the detection accuracy decreases, and the calculation result of the average rotation speed Nave by Equation (1) becomes inappropriate. Therefore, in the second embodiment, the temperature of the pressure roller 132 is estimated based on a heat balance of a supply heat amount (supply power amount) by the heater 133, a heat amount taken away by the recording material passing through the fixing portion 5, and a heat dissipation amount from the pressure roller 132 to the atmosphere, and the rotation speed of the pressure roller 132 is corrected.

The heat amount supplied from the heater 133 to the pressure roller 132 while one sheet of recording material passes through the fixing nip portion FN is defined as ΔQin. The heat amount taken away from the pressure roller 132 during the passage of the one sheet of recording material is defined as ΔQout. An estimated temperature of the pressure roller 132 is defined as Tf. An ambient temperature around the pressure roller 132 is defined as T0. A recording material passage interval between an n-th recording material and an n+1th recording material is defined as Δtp. A temperature change ΔTf in the temperature of the pressure roller 132 when the n+1th recording material is conveyed with respect to the temperature of the pressure roller 132 when the n-th recording material is conveyed is expressed by the following Equation (7).

$$\Delta Tf = Tf(n+1) - Tf(n) = \frac{1}{c}\{\Delta Qin - \Delta Qout - hS(Tf - T0)\Delta tp\} \quad \text{Equation (7)}$$

Here, a heat capacity C, a heat transfer coefficient "h" to the atmosphere, and a surface area S of the pressure roller 132 are parameters stored in advance in the storage portion 302 according to the configuration of the fixing portion 5. The heat amount ΔQout taken away from the pressure roller 132 is appropriately obtained by multiplying a heat amount per unit length in the conveyance direction CD for each type of recording material stored in the storage portion 302 by a length of the recording material in the conveyance direction CD. The recording material passage interval Δtp is obtained from the stop time of the registration roller 115, the interval between the exposure start signals, or the passage time interval of the recording material at the predetermined position, as described in the first embodiment. When forming images on a plurality of recording materials, the recording material passage interval Δtp may be obtained from an interval between the exposure start signal for the preceding recording material and the exposure start signal for the subsequent recording material. When forming images on a plurality of recording materials, the recording material passage interval Δtp may be obtained from a stop time, a drive start interval, or a drive stop interval of the registration drive motor 401. The ambient temperature T0 around the pressure roller 132 is obtained from the environmental sensor (temperature and humidity sensor) 120 provided in the image forming apparatus 100. The ambient temperature T0 around the pressure roller 132 may be obtained from a temperature sensor disposed in the vicinity of the pressure roller 132 separately from the environmental sensor 120.

A coefficient of linear expansion with respect to the temperature change ΔTf of the pressure roller 132 is defined as a. As the diameter "d" of the pressure roller 132 becomes longer by α×ΔTf×d, the conveyance speed of the fixing portion 5 is approximately proportional to the temperature of the pressure roller 132. Therefore, the increasing rate Vf_rate of the conveyance speed Vf(n+1) of the n+1th recording material Pn+1 with respect to the conveyance speed Vf(n) of the n-th recording material Pn is expressed by the following Equation (8).

$$Vf_{\_rate} = \frac{Vf(n+1)}{Vf(n)} - 1 = \frac{k\alpha\Delta Tf}{Vf0 + k\alpha\sum Tf(n)} \quad \text{Equation (8)}$$

Here, Vf0 is the conveyance speed of the fixing portion 5 in the standby state at the reference rotation speed N0 stored in advance in the storage portion 302. "k" is an increase factor representing an increasing amount in the conveyance speed with respect to the change in the diameter "d" of the pressure roller 132. The conveyance speed Vf0 and the increase factor "k" are parameters stored in advance in the storage portion 302.

Figure 9A:
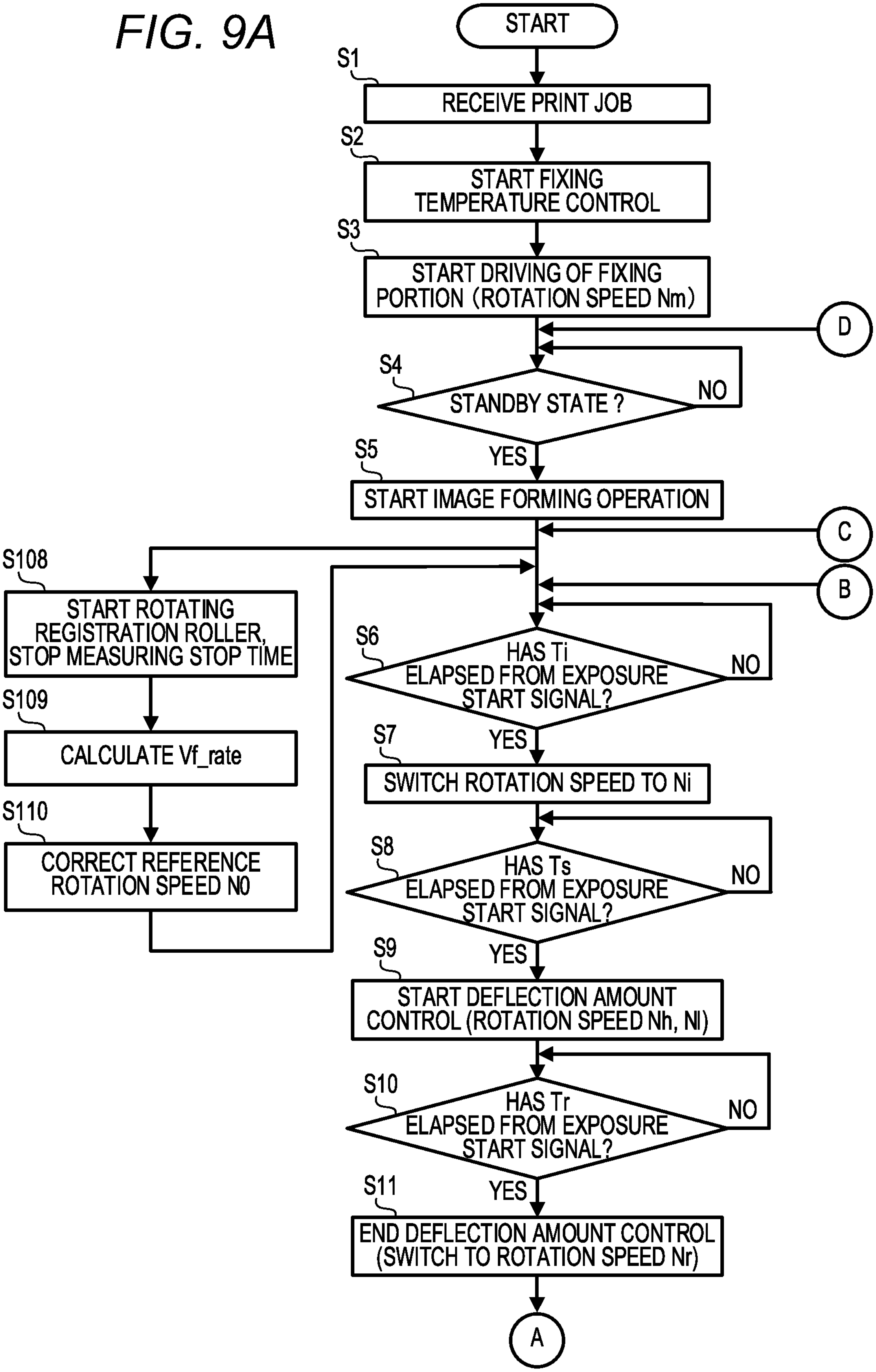
FIG. 9A and FIG. 9B are flowcharts showing a control operation of rotation speed correction for the fixing portion based on a temperature estimation of a pressure roller.
Figure 9B:
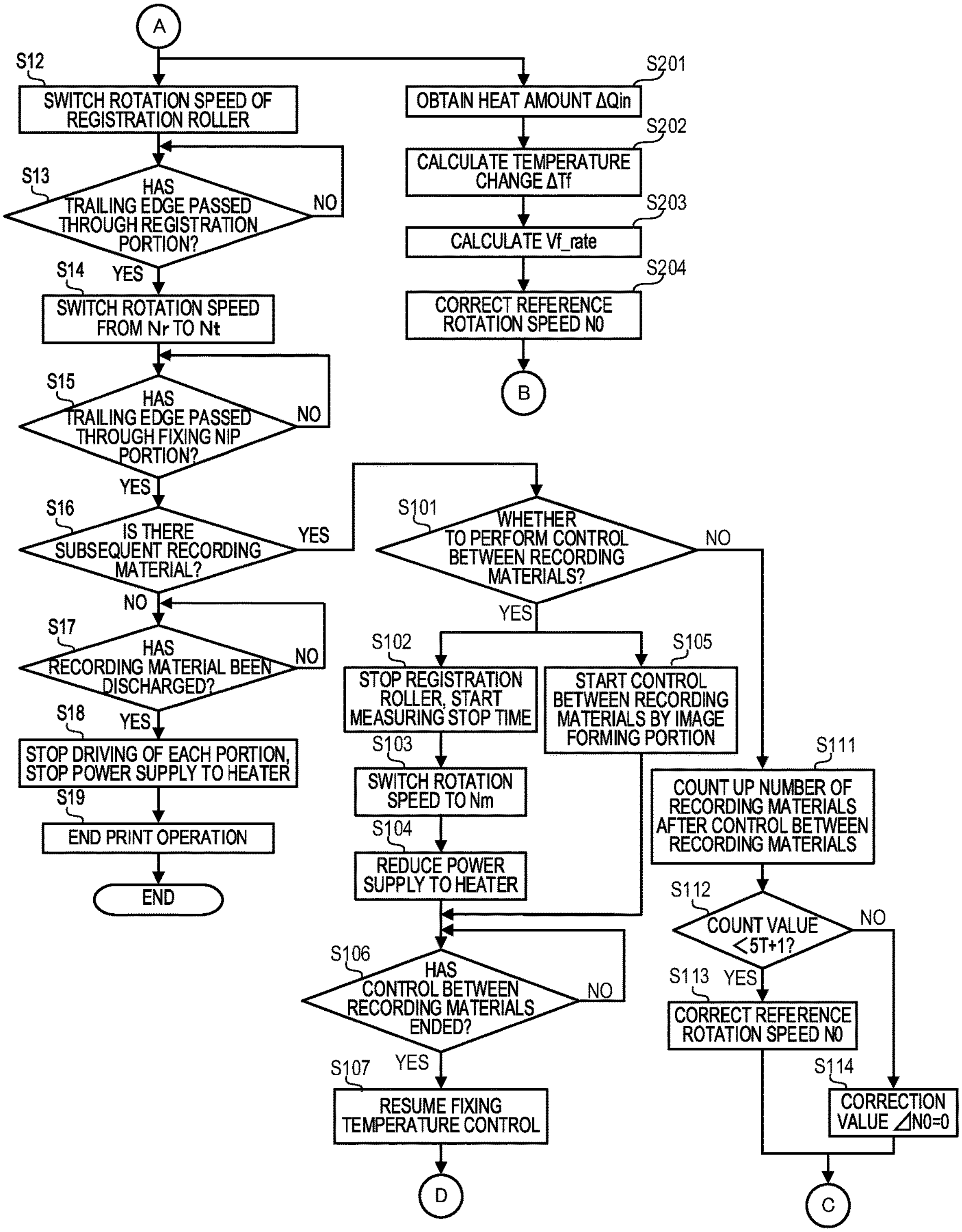

Next, a control operation of the fixing portion 5 using Equation (7) and Equation (8) will be described with reference to FIG. 9A and FIG. 9B. FIG. 9A and FIG. 9B are flowcharts showing the control operation of rotation speed correction for the fixing portion 5 based on a temperature estimation of the pressure roller 132. In FIG. 9A and FIG. 9B, the same steps as those in FIG. 4, FIG. 8A, and FIG. 8B are denoted by the same symbols and the explanations thereof are omitted.

The controller 301 starts the fixing temperature control of the fixing roller 131 (S2). When the surface temperature of the fixing roller 131 reaches the predetermined temperature and the fixing portion 5 enters the standby state (YES in S4), the controller 301 starts the image forming operation by the image forming portion (S5). The reference rotation speed N0(1) of the fixing portion 5 with respect to the first recording material P1 uses the initial value stored in the storage portion 302. As in the first embodiment, the rotation speeds Ni, Nr, and Nt of the pressure roller 132 during the recording material passage are respectively set by the ratios to the reference rotation speed N0. Therefore, the rotation speed of the pressure roller 132 from before the leading edge of the recording material P1 reaches the fixing nip portion FN until the trailing edge of the recording material P1 passes through the fixing nip portion FN can be uniquely determined.

In the first embodiment, after the deflection amount control of the first recording material P1 is ended, the rotation speed of the pressure roller 132 is switched to the rotation speed Nr (S11), and the controller 301 calculates the average rotation speed Nave of the pressure roller 132 from Equation (1) based on the deflection amount detection result (S115). Then, the controller 301 calculates the correction value ΔN0, which is the difference between the average rotation speed Nave and the reference rotation speed N0(1) of the first recording material P1, and sets the reference rotation speed N0(2) for the second recording material P2 based on the correction value ΔN0 (S116). On the contrary, in the second embodiment, Equation (7) and Equation (8) are used instead of Equation (1). The controller 301 obtains the heat amount ΔQin supplied from the heater 133 to the pressure roller 132 while the first recording material P1 passes through the fixing nip portion FN (S201). The controller 301 calculates the temperature change ΔTf of the pressure roller 132 from Equation (7) using the heat amount ΔQin (S202). The controller 301 calculates the increasing rate Vf_rate of the conveyance speed of the second recording material P2 from Equation (8) using the temperature change ΔTf (S203). The controller 301 calculates the reference rotation speed N0(2) of the fixing portion 5 with respect to the second recording material P2 from Equation (3) using the increasing rate Vf_rate, and corrects the reference rotation speed N0 to cancel out the increasing rate Vf_rate (S204). The subsequent control operation of the rotation speed correction for the fixing portion 5 is the same as in the first embodiment shown in FIG. 8A and FIG. 8B. Note that in the second embodiment, the value (initial value) stored in the storage portion 302 as the reference rotation speed N0 for the fixing portion 5 is not rewritten, but the difference between the reference rotation speed N0(*j*) obtained from Equation (3) and the initial reference rotation speed N0 is stored in the storage portion 302 as the correction value ΔN0.

According to the second embodiment, even for a recording material with a short length in the conveyance direction CD for which it is difficult to correct the rotation speed of the fixing portion 5 using the deflection amount detection result, the conveyance speed of the fixing portion 5 can be appropriately corrected by estimating the temperature change of the pressure roller 132. Depending on the length of the recording material, the rotation speed of the fixing portion 5 may be controlled by switching between the rotation speed correction using the deflection amount detection result of the first embodiment and the rotation speed correction using the temperature change ΔTf of the pressure roller 132 in the second embodiment. According to the second embodiment, the rotation speed of the fixing portion 5 can be controlled according to the change in the recording material passage interval.

Third Embodiment

The third embodiment will be described below. In the third embodiment, the same structures as in the first embodiment are denoted by the same reference symbols and the explanations thereof are omitted. The configuration and operation of the image forming apparatus 100 in the third embodiment are the same as those of the first embodiment, so the explanations thereof are omitted. The rotation speed correction for the fixing portion 5 in the third embodiment is different from the first embodiment. The difference will be mainly described below.

(Rotation Speed Correction for Fixing Portion Based on Temperature Estimation of Pressure Roller at Start of Print Job)

In the first embodiment and the second embodiment, the fixing drive control from the reception of the print job to the end of the print operation was described. In the case in which the image forming operation is started from the state in which the temperature of the pressure roller 132 is approximately equal to the environmental temperature, when the first sheet of recording material P1 is passed through the fixing portion 5, the rotation speed (third rotation speed) of the fixing portion 5 is set based on the reference rotation speed N0 stored as the initial value in the storage portion 302. This is effective in the case in which the image forming apparatus 100 installed in the general office environment occasionally prints on a small number of sheets of recording materials.

However, when the print operation in which the large number of sheets of recording materials are continuously passed is performed, the pressure roller 132 immediately after the print operation has a large amount of expansion and a large temperature rise relative to the initial stage, as can be seen from the increasing rate in the conveyance speed of the fixing portion 5 shown in FIG. 5. As described above, in the pressure roller 132, the elastic layer such as silicone rubber is provided on the outside of the solid or hollow cylindrical metal shaft, and the release layer of fluororesin is formed on the surface of the elastic layer. Since the heat capacity of the pressure roller 132 is large, the temperature of the pressure roller 132 does not immediately return to the original environmental temperature even if the power supply to the heater 133 is stopped. Therefore, for example, if the next print operation is performed without much time after the large number of sheets of recording materials have been continuously passed, the pressure roller 132 will be reheated in the middle of natural cooling. In this case, if the fixing drive control is performed for the first sheet of recording material using the reference rotation speed N0 stored in advance in the storage portion 302, the temperature of the pressure roller 132 is higher than expected and the diameter of the pressure roller 132 is larger than expected, resulting in a faster conveyance speed of the recording material.

Although FIG. 5 shows the example in which the conveyance speed of the fixing portion 5 gradually increases with the continuous sheet passing of the recording materials, there is a case in which the conveyance speed may gradually slow down. For example, if an image is formed on a recording material with a large heat amount required for fixing a toner image in the immediately preceding print job to increase the temperature of the pressure roller 132, and then images are formed on recording materials with a small heat amount required in the next print job, the temperature of the pressure roller 132 gradually decreases.

Therefore, in the third embodiment, a temperature drop of the pressure roller 132 is estimated based on an elapsed time after a print operation is ended and heating by the heater 133 is stopped, and a rotation speed (fourth rotation speed) of the fixing portion 5 with respect to the first recording material in a next print operation is corrected.

When the print operation is completed and the power supply to the heater 133 is stopped, the temperature change of the pressure roller 132 is expressed by the following Equation (9).

$$C\frac{dTf}{dt} = -hS(Tf - T0) \qquad \text{Equation (9)}$$

Considering that the ambient temperature T0 around the pressure roller 132 also varies with time, Equation (9) is expressed by the following Equation (10) as a difference equation.

$$Tf(ts + \Delta ts) = Tf(ts) - \frac{hS}{C}\{Tf(ts) - T0(ts)\}\Delta ts \qquad \text{Equation (10)}$$

Here, “ts” is a power supply stop time after the power supply to the heater 133 is stopped, and Δts is an update interval of the temperature of the pressure roller 132 during the stop of printing, which is set in advance in the storage portion 302.

Next, a control operation of the fixing portion 5 using Equation (10) will be described with reference to FIG. 10A, FIG. 10B, FIG. 10C, and FIG. 10D. FIG. 10A, FIG. 10B, FIG. 10C, and FIG. 10D are flowcharts showing the control operation of rotation speed correction for the fixing portion 5 based on the temperature estimation of the pressure roller 132 during the stop of the print job. In FIG. 10A, FIG. 10B, FIG. 10C, and FIG. 10D, the same steps as those in FIG. 4, FIG. 8A, FIG. 8B, FIG. 9A, and FIG. 9B are denoted by the same symbols and the explanations thereof are omitted.

Figure 10A:
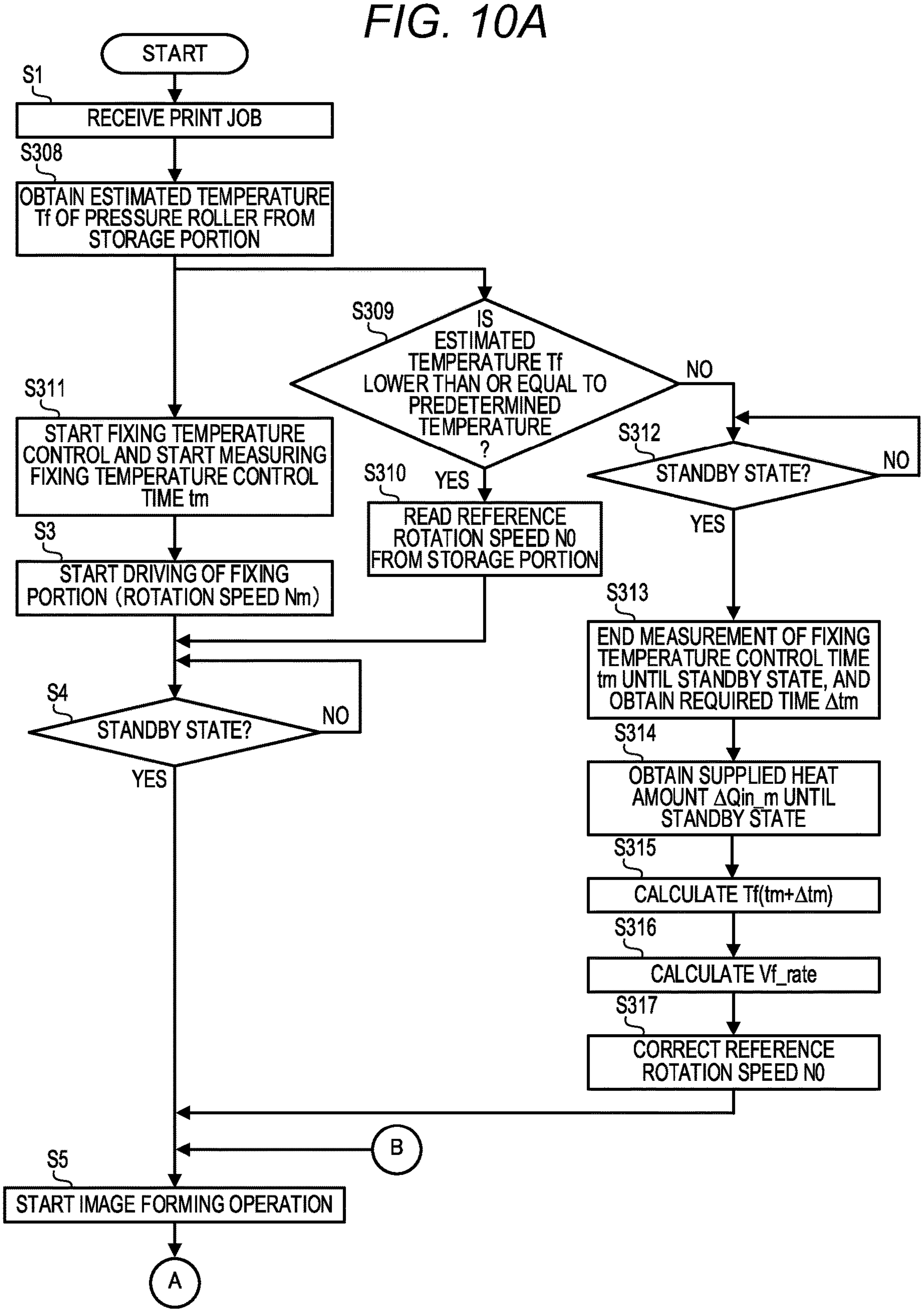
FIG. 10A, FIG. 10B, FIG. 10C, and FIG. 10D are flowcharts showing a control operation of rotation speed correction for the fixing portion based on the temperature estimation of the pressure roller during the stop of a print job.

The explanation of the third embodiment begins with the discharge of the recording material at the end of the previous print job. Referring to FIG. 10D, in S16, the controller 301 determines whether there is a subsequent recording material. In a case in which it is determined that there is no subsequent recording material (NO in S16), the controller 301 determines whether the last recording material has been discharged (S17). In a case in which the last recording material has been discharged (YES in S17), the controller 301 stops driving of each portion including the fixing portion 5 and power supply to the heater 133 (S18), and ends the print operation (S19). At the same time, the controller 301 starts measuring the power supply stop time "ts" to the heater 133 (S301). After that, the controller 301 obtains the ambient temperature T0 around the pressure roller 132 by the environmental sensor 120 at each update interval Δts that is set in advance, and calculates the estimated temperature Tf of the pressure roller 132 from Equation (10). Specifically, the controller 301 determines whether the update interval Δts has elapsed from the previous update of the estimated temperature Tf of the pressure roller 132 (S302). In a case in which it is determined that the update interval Δts has elapsed (YES in S302), the controller 301 obtains the ambient temperature T0 around the pressure roller 132 based on the detection result of the environmental sensor 120 (S303). The controller 301 calculates the estimated temperature Tf of the pressure roller 132 from Equation (10) using the power supply stop time "ts", the update interval Δts, and the ambient temperature T0 (S304).

The controller 301 sequentially stores the updated latest estimated temperature Tf of the pressure roller 132 in the storage portion 302 (S305). The controller 301 determines whether the ambient temperature T0 around the pressure roller 132 is within a predetermined temperature range and the estimated temperature Tf of the pressure roller 132 is lower than or equal to a predetermined temperature (S306). In a case in which the ambient temperature T0 is not within the predetermined temperature range or the estimated temperature Tf is higher than the predetermined temperature (N0 in S306), the controller 301 returns the processing to S302 and updates the ambient temperature T0 and the estimated temperature Tf after the update interval Δts has elapsed. In a case in which the ambient temperature T0 is within the predetermined temperature range and the estimated temperature Tf is lower than or equal to the predetermined temperature (YES in S306), the controller 301 stops updating the estimated temperature Tf of the pressure roller 132 by Equation (10) (S307). Note that in the third embodiment, in a case in which the ambient temperature T0 around the pressure roller 132 is within the predetermined temperature range of 20° C. to ~27° C. and the estimated temperature Tf of the pressure roller 132 is lower than or equal to the predetermined temperature of 27° C., the controller 301 stops updating the estimated temperature Tf.

The previous print job ends and a new print job is started. Referring to FIG. 10A, when the controller 301 receives the new print job (S1), the controller 301 obtains the latest estimated temperature Tf of the pressure roller 132 from the storage portion 302 (S308). The controller 301 advances the processing to S311 and S309. The controller 301 outputs the power control signal to the heater 133 to start the fixing temperature control of the fixing roller 131 and to start measuring a fixing temperature control time "tm" (S311). The controller 301 starts driving the pressure roller 132 of the fixing portion 5 by the fixing drive motor 403 (S3). On the other hand, the controller 301 determines whether the estimated temperature Tf of the pressure roller 132 is lower than or equal to the predetermined temperature (S309). In a case in which the estimated temperature Tf is lower than or equal to the predetermined temperature (YES in S309), the controller 301 reads the reference rotation speed N0 previously stored as the initial value in the storage portion 302 as the reference rotation speed N0 for setting the subsequent rotation speed of the pressure roller 132 (S310). The controller 301 advances the processing to S4.

In a case in which the estimated temperature Tf of the pressure roller 132 has not returned to the predetermined temperature and the estimated temperature Tf of the pressure roller 132 is higher than the predetermined temperature (NO in S309), the controller 301 corrects the reference rotation speed N0 by taking into account the estimated temperature Tf of the pressure roller 132. The controller 301 determines whether the fixing portion 5 is in the standby state (S312) based on the detection signal of the fixing roller temperature sensor 134. In a case in which the fixing portion 5 enters the standby state (YES in S312), the controller 301 ends the measurement of the fixing temperature control time "tm" until the standby state, and obtains a required time Δtm (S313). The controller 301 obtains a heat amount ΔQin m supplied from the heater 133 to the pressure roller 132 until the standby state (S314). The controller 301 calculates, from the following Equation (11), an estimated temperature Tf(tm+Δtm) of the pressure roller 132 when the first sheet of recording material P1 is passed through the fixing portion 5 (S315).

$$Tf(tm+\Delta tm) = Tf(tm) + \frac{1}{C}[\Delta \text{Qin\_m} - hS\{Tf(tm) - T0(tm)\}\Delta tm]$$

Using the estimated temperature Tf(tm+Δtm) of the pressure roller 132, the controller 301 calculates, from the following Equation (12), an increasing rate Vf_rate in the conveyance speed while passing the first recording material P1 through the fixing portion 5 (S316).

$$Vf_{\_rate} = \frac{k\alpha\{Tf(tm+\Delta tm) - Tf0\}}{Vf0 + k\alpha\{Tf(tm+\Delta tm) - Tf0\}} \quad \text{Equation (12)}$$

Here, Tf0 is a parameter stored in advance in the storage portion 302 as a standard temperature of the pressure roller 132 in a case in which the temperature control of the fixing portion 5 is started from the state left in the office environment and enters the standby state. The controller 301 calculates the reference rotation speed N0(1) with respect to the first recording material P1 from the following Equation (13) and corrects the reference rotation speed N0 (S317).

$$N0(1) = \frac{N0}{1 + \text{Vf\_rate}} \quad \text{Equation (13)}$$

Also in the third embodiment, the value (initial value) of the reference rotation speed N0 of the fixing portion 5 stored in advance in the storage portion 302 is not rewritten, but a difference from N0(1) according to Equation (13) is stored in the storage portion 302 as the correction value ΔN0 for the initial value.

In the third embodiment, the example of correcting the reference rotation speed N0 using Equation (11), Equation (12), and Equation (13) is described, but the third embodiment is not limited to this example. For example, more conveniently, a relationship between the increasing rate Vf_rate in the conveyance speed of the first sheet of recording material and the estimated temperature Tf(tm+Δtm) of the pressure roller 132 at the time of resuming the temperature control by the heater 133 may be stored in the storage portion 302 in advance as a table format. A relationship between the increasing rate Vf_rate in the conveyance speed and the correction value ΔN0 for the reference rotation speed N0 may be stored in advance in the storage portion 302 as a table format. Alternatively, a relationship between the correction value ΔN0 for the reference rotation speed N0 and the estimated temperature Tf(tm+Δtm) of the pressure roller 132 at the time of resuming the temperature control by the heater 133 may be stored in the storage portion 302 in advance as a table format.

Figure 10B:
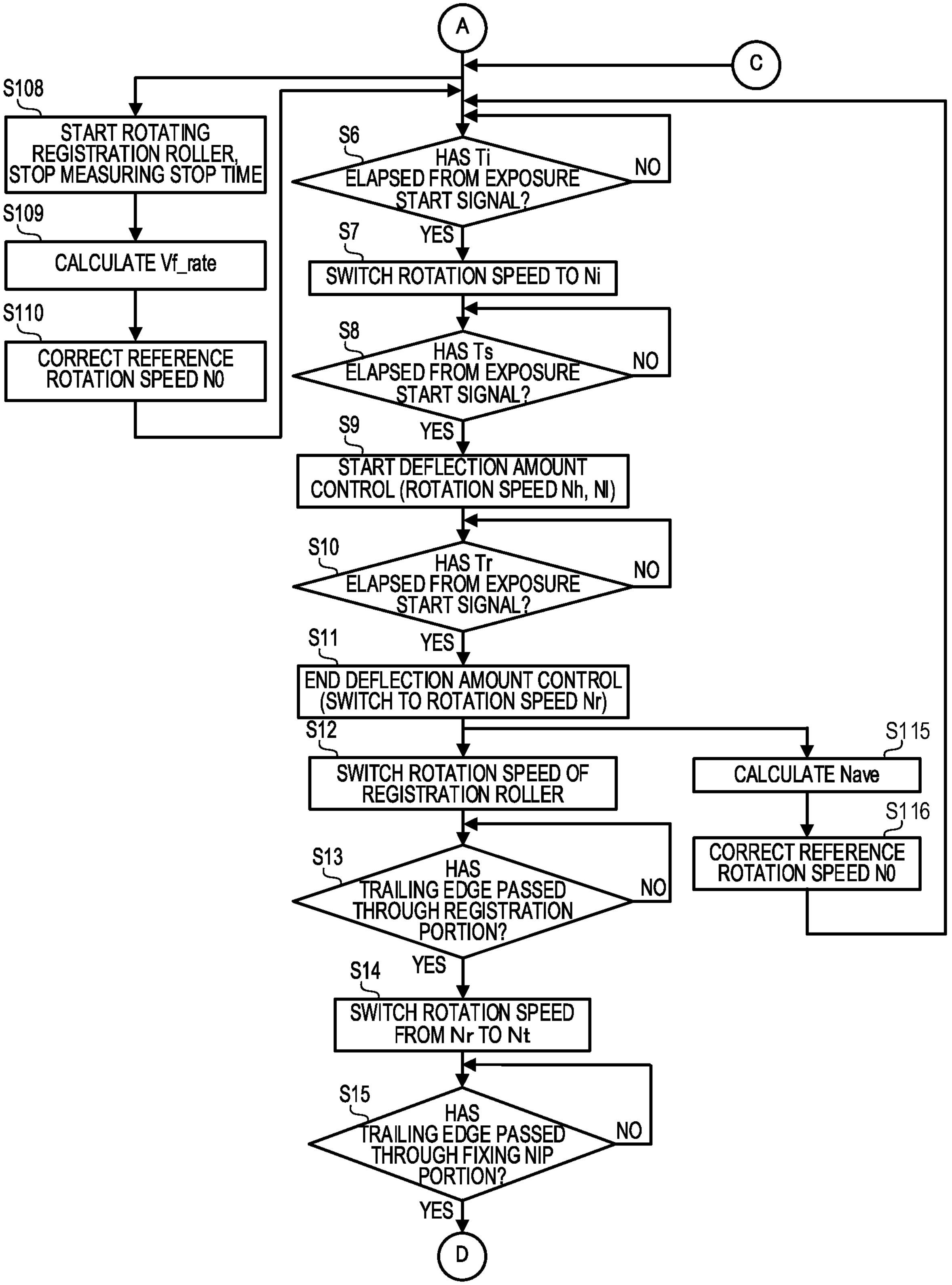
Figure 10C:
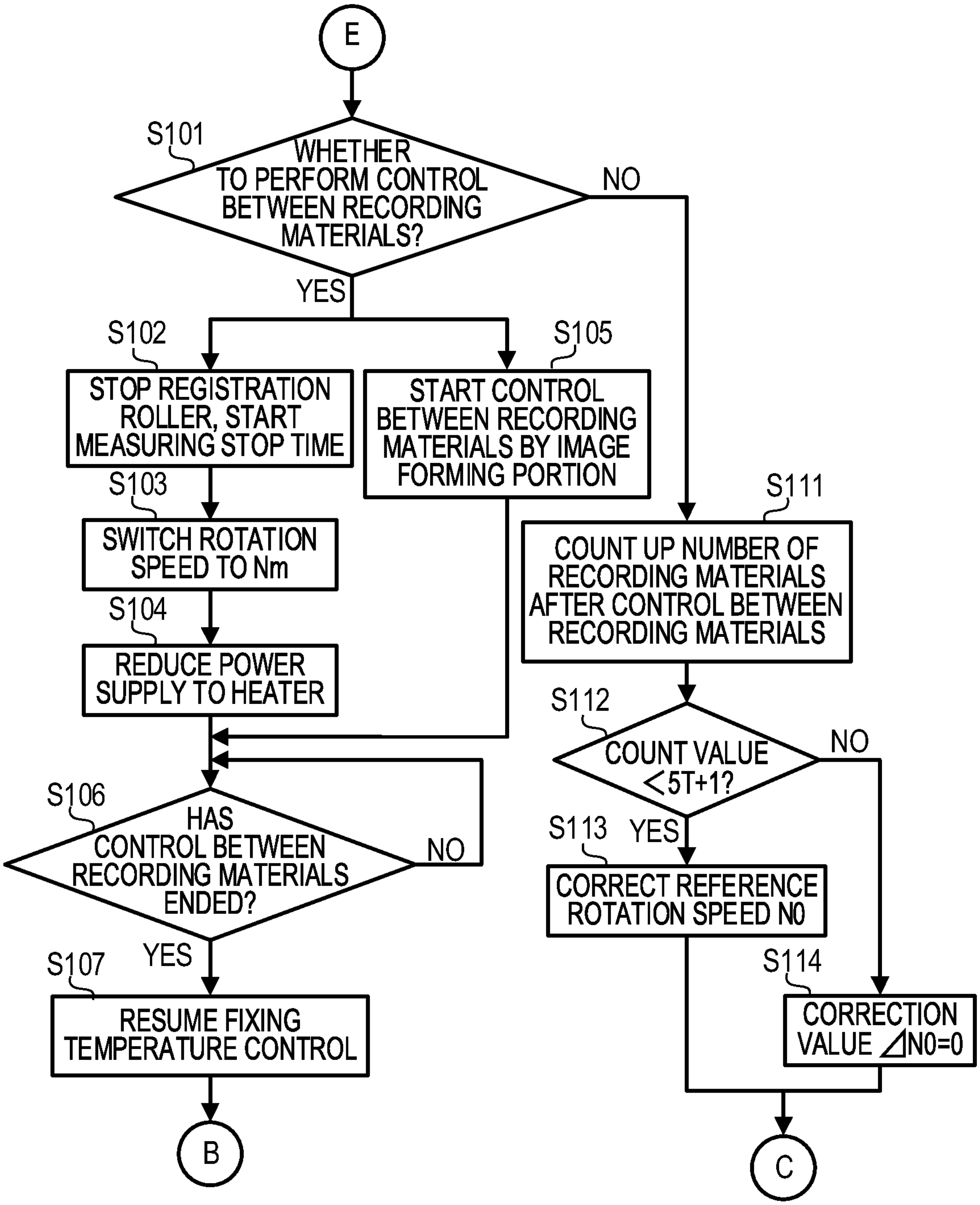
Figure 10D:
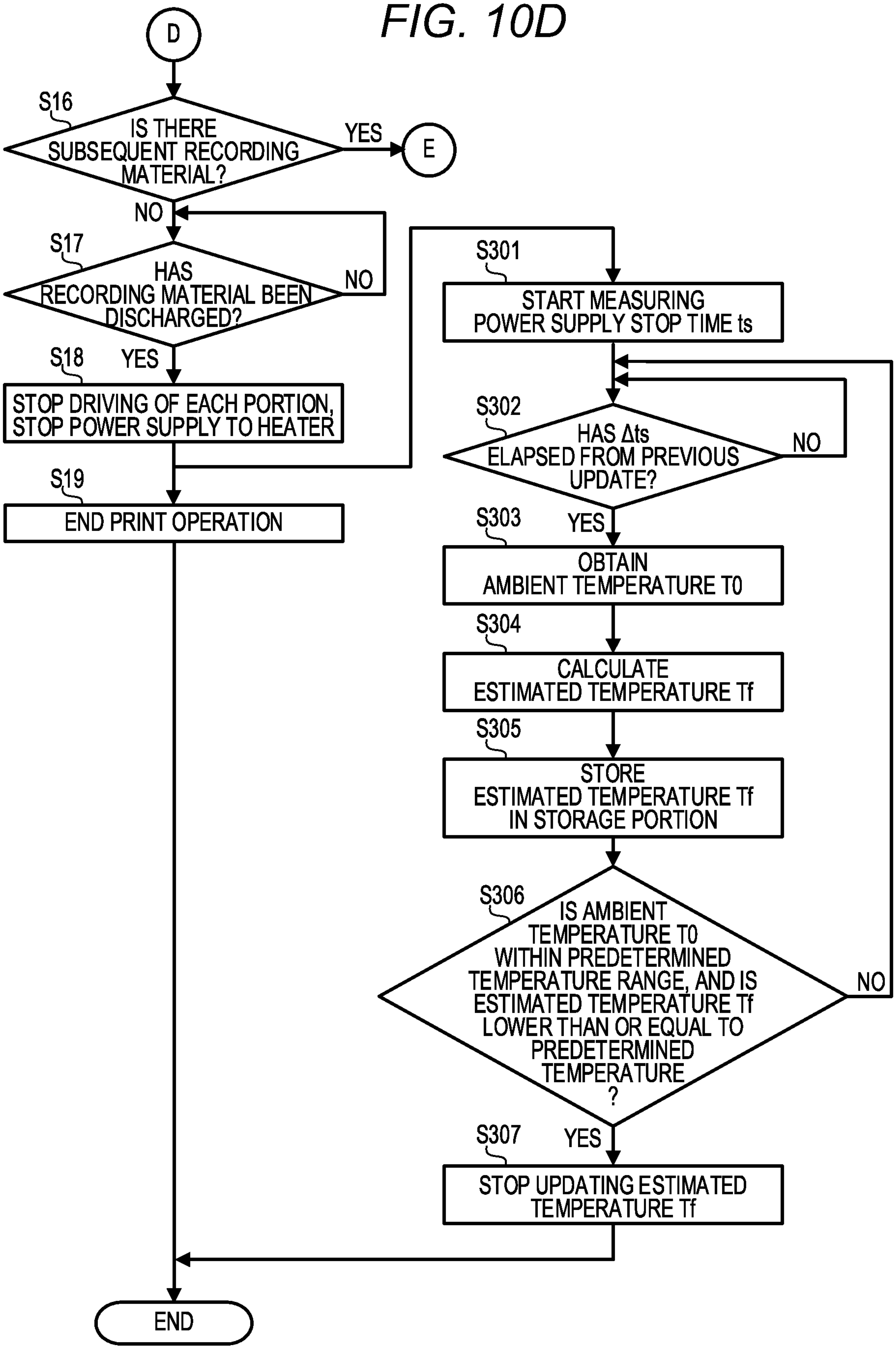

In the third embodiment, FIG. 10B shows the control operation of correcting the reference rotation speed N0 (S115, S116) using the deflection amount detection result described in the first embodiment with respect to the increase in the conveyance speed due to the thermal expansion of the pressure roller 132 during continuous sheet passing. However, the third embodiment is not limited to this. The correction of the reference rotation speed N0 of the fixing portion 5 based on the temperature estimation of the pressure roller 132 described in the second embodiment (S201 to S204 in FIG. 9B) may be performed. Alternatively, the rotation speed of the fixing portion 5 may be controlled by switching between the two according to the length of the recording material.

According to the third embodiment, the temperature drop of the pressure roller 132 between print jobs is estimated even if a print operation is performed again before the temperature of the pressure roller 132 returns to the original temperature after a print operation is ended and the heating by the heater 133 is stopped. Based on the estimated temperature of the pressure roller 132, the rotation speed of the fixing portion 5 can be appropriately corrected from the first sheet of recording material. According to the third embodiment, even if a next print job is started before the temperature of the pressure roller 132 returns to the ambient temperature after the end of a previous print job, the rotation speed of the fixing portion 5 with respect to the first recording material can be appropriately corrected.

According to the first to the third embodiments, it is possible to control the conveyance speed of the recording material in the fixing portion 5 even for a recording material of which a length in the conveyance direction CD is so short that makes it difficult to stably detect the deflection amount, and even for a sudden change in the diameter of the pressure roller 132 in a case in which the recording material passage interval is widened. This can suppress image defects, damage to the recording material and poor conveyance. According to the third embodiment, the rotation speed of the fixing portion 5 can be controlled according to the change in the recording material passage interval.

Other Embodiments

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-001577, filed Jan. 7, 2022, which is hereby incorporated by reference herein in its entirety.

What is claimed is:

1. An image forming apparatus comprising:

a transfer roller which transfers a toner image to a recording material conveyed in a conveyance direction;

a fixing portion disposed downstream of the transfer roller in the conveyance direction, having a heating unit and a cylindrical rotary member configured to convey the recording material, and configured to fix the toner image to the recording material conveyed from the transfer roller;

a motor which drives the cylindrical rotary member; and a controller configured to control the motor to control a rotation speed of the cylindrical rotary member, wherein, in a case in which images are formed on a plurality of recording materials, the controller controls the motor based on a time period from a time when a trailing edge of a preceding recording material passes through the fixing portion to a time when a leading edge of a subsequent recording material passes through the fixing portion so that a second rotation speed of the cylindrical rotary member when the cylindrical rotary member of the fixing portion conveys the subsequent recording material becomes lower than a first rotation speed of the cylindrical rotary member when the cylindrical rotary member of the fixing portion conveys the preceding recording material.

2. The image forming apparatus according to claim 1, wherein the controller controls the motor based on the time period from the time when the trailing edge of the preceding recording material passes through the fixing portion to the time when the leading edge of the subsequent recording material passes through the fixing portion so that a difference between the first rotation speed and the second rotation speed becomes larger as the time period becomes longer.

3. The image forming apparatus according to claim 1, wherein the controller controls the motor based on the time period from the time when the trailing edge of the preceding recording material passes through the fixing portion to the time when the leading edge of the subsequent recording material passes through the fixing portion to change the rotation speed of the cylindrical rotary member so that the rotation speed of the cylindrical rotary member increases from the second rotation speed each time a recording material is conveyed and converges toward the first rotation speed.

4. The image forming apparatus according to claim 3, wherein the controller controls the motor so that a change width by which the rotation speed of the cylindrical rotary member is changed so that the rotation speed of the cylindrical rotary member that increases from the second rotation speed each time the recording material is conveyed is made smaller each time a recording material is conveyed.

5. The image forming apparatus according to claim 1, wherein the controller controls the motor so that the rotation speed of the cylindrical rotary member is sequentially switched for each of a plurality of conveyance sections according to a predetermined timing while the preceding recording material from a leading edge to the trailing edge of the preceding recording material passes through the fixing portion, and wherein the controller controls the motor based on the time period from the time when the trailing edge of the preceding recording material passes through the fixing portion to the time when the leading edge of the subsequent recording material passes through the fixing portion so that a rotation speed for at least one conveyance section among respective rotation speeds for the plurality of conveyance sections with respect to the subsequent recording material becomes lower than a rotation speed for the same conveyance section with respect to the preceding recording material.

6. The image forming apparatus according to claim 1, wherein, in a case in which the images are formed on the plurality of recording materials while the plurality of recording materials are continuously conveyed at approximately the same time interval, the controller controls the motor to gradually change a rotational speed of the cylindrical rotary member to either increase or decrease according to a number of recording material passages of plural recording materials passing through the fixing portion, and to reduce, as the number of recording material passages increases, a total change amount in the rotational speed changed during conveyance of a predetermined number of recording materials at approximately the same time interval.

7. The image forming apparatus according to claim 1, further comprising a flag and a sensor which are disposed between the transfer roller and the fixing portion to detect a conveyance speed of the recording material when the recording material is conveyed while extending over the transfer roller and the fixing portion, wherein, in a case in which the images are formed on the plurality of recording materials while the plurality of recording materials are continuously conveyed at approximately the same time interval, the controller controls the motor based on a conveyance speed detection result of the preceding recording material to control the rotation speed of the cylindrical rotary member when the subsequent recording material is conveyed.

8. The image forming apparatus according to claim 7, wherein the flag and the sensor detect a deflection amount of the recording material between the transfer roller and the fixing portion, and wherein the flag and the sensor detect at least a state in which the recording material has a first deflection amount and a state in which the recording material has a second deflection amount larger than the first deflection amount, wherein the controller controls the motor based on a deflection amount detection result of the flag and the sensor to change the rotation speed of the cylindrical rotary member so that the deflection amount of the recording material falls within a predetermined range, and wherein the controller calculates an average rotation speed of the cylindrical rotary member from a detection time and the rotation speed during the state in which the recording material has the first deflection amount and a detection time and the rotation speed during the state in which the recording material has the second deflection amount.

9. The image forming apparatus according to claim 8, wherein the rotation speed of the cylindrical rotary member, which is changed based on the time period from the time when the trailing edge of the preceding recording material passes through the fixing portion to the time when the leading edge of the subsequent recording material passes through the fixing portion, includes at least a rotation speed of the cylindrical rotary member in a conveyance section other than a conveyance section in which the rotation speed of the cylindrical rotary member is changed based on the deflection amount detection result of the flag and the sensor so that the deflection amount of the recording material falls within the predetermined range.

10. The image forming apparatus according to claim 1, wherein, in the case in which the images are formed on the plurality of recording materials, the controller obtains the time period from the time when the trailing edge of the preceding recording material passes through the fixing portion to the time when the leading edge of the subsequent recording material passes through the fixing portion from an interval between an exposure start signal for the preceding recording material and an exposure start signal for the subsequent recording material.

11. The image forming apparatus according to claim 1, further comprising:

a pair of registration rollers which is disposed upstream of the transfer roller in the conveyance direction and which conveys the recording material to the transfer roller; and a registration motor which drives the pair of registration rollers, wherein, in the case in which the images are formed on the plurality of recording materials, the controller controls the registration motor so that the registration motor is stopped at least once after the trailing edge of the preceding recording material passes through the pair of registration rollers, and then the registration motor is started again to convey the subsequent recording material to the transfer roller, and wherein the controller obtains the time period from the time when the trailing edge of the preceding recording material passes through the fixing portion to the time when the leading edge of the subsequent recording material passes through the fixing portion from a stop time, a drive start interval or a drive stop interval of the registration motor.

12. The image forming apparatus according to claim 1, further comprising:

a pair of registration rollers which is disposed upstream of the transfer roller in the conveyance direction and which conveys the recording material to the transfer roller; and a recording material sensor which is disposed in a conveyance path from the pair of registration rollers to the fixing portion and which detects a passing timing of a leading edge of the recording material, wherein, in the case in which the images are formed on the plurality of recording materials, the controller obtains the time period from the time when the trailing edge of the preceding recording material passes through the fixing portion to the time when the leading edge of the subsequent recording material passes through the fixing portion from a detection result of the recording material sensor.

13. The image forming apparatus according to claim 1, further comprising:

a pair of registration rollers which is disposed upstream of the transfer roller in the conveyance direction and which conveys the recording material to the transfer roller; and a recording material sensor disposed in a conveyance path from a position upstream of the pair of registration rollers by a length of the recording material in the conveyance direction to the transfer roller and which detects a passing timing of a trailing edge of the recording material, wherein, in the case in which the images are formed on the plurality of recording materials, the controller obtains the time period from the time when the trailing edge of the preceding recording material passes through the fixing portion to the time when the leading edge of the subsequent recording material passes through the fixing portion from a detection result of the recording material sensor.

* * * * *